United States Patent
Velev et al.

(10) Patent No.: US 12,317,183 B2
(45) Date of Patent: May 27, 2025

(54) NETWORK SLICE SELECTION ASSISTANCE INFORMATION CONFIGURATION

(71) Applicant: Lenovo (Singapore) Pte. Ltd., New Tech Park (SG)

(72) Inventors: Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/176,727

(22) Filed: Mar. 1, 2023

(65) Prior Publication Data

US 2023/0209455 A1 Jun. 29, 2023

Related U.S. Application Data

(63) Continuation of application No. 17/180,038, filed on Feb. 19, 2021, now Pat. No. 11,627,522, which is a
(Continued)

(51) Int. Cl.
*H04W 8/08* (2009.01)
*H04W 8/02* (2009.01)
(Continued)

(52) U.S. Cl.
CPC ............. *H04W 48/18* (2013.01); *H04W 8/02* (2013.01); *H04W 8/08* (2013.01); *H04W 16/02* (2013.01);
(Continued)

(58) Field of Classification Search
CPC ....... H04W 48/18; H04W 12/06; H04W 4/50; H04W 60/00; H04W 60/04; H04W 76/10;
(Continued)

(56) References Cited

U.S. PATENT DOCUMENTS 10,945,198 B2 * 3/2021 Velev ...................... H04W 8/02
11,140,621 B2 * 10/2021 Velev .................... H04W 60/04
(Continued)

FOREIGN PATENT DOCUMENTS

| CN | 108616931 A | * | 10/2018 | ............. H04L 47/20 |
| WO | WO-2018097601 A1 | * | 5/2018 | ............. H04W 60/06 |
| WO | 2019019037 A1 | | 1/2019 | |

OTHER PUBLICATIONS

3GPP TS 23.501 V2.0.1—(Dec. 15, 2017)—Technical Specification Group Services and System Aspects; System Architecture for the 5G System; https://www.3gpp.org/ftp//Specs/archive/23_series/23.501/23501-201.zip (Year: 2017).*
(Continued)

*Primary Examiner* — Quan M Hua
(74) *Attorney, Agent, or Firm* — Kunzler Bean & Adamson

(57) ABSTRACT

Apparatuses, methods, and systems are disclosed for NSSAI configuration. One method includes determining a configured network slice selection assistance information for a public land mobile network for a remote unit in response to a trigger from an access and mobility management function. The access and mobility management function, a network slice selection function, or a combination thereof determines the configured network slice selection assistance information. The method includes providing the configured network slice selection assistance information to the remote unit via the access and mobility management function.

13 Claims, 12 Drawing Sheets

Related U.S. Application Data continuation of application No. 16/228,283, filed on Dec. 20, 2018, now Pat. No. 10,945,198.

(60) Provisional application No. 62/609,642, filed on Dec. 22, 2017.

(51) Int. Cl.

| | | |
|---|---|---|
| *H04W 16/02* | (2009.01) | |
| *H04W 48/00* | (2009.01) | |
| *H04W 48/18* | (2009.01) | |
| *H04W 60/00* | (2009.01) | |
| *H04W 84/04* | (2009.01) | |

(52) U.S. Cl.
CPC .......... *H04W 48/00* (2013.01); *H04W 60/00* (2013.01); *H04W 84/042* (2013.01)

(58) Field of Classification Search
CPC ..... H04W 8/18; H04W 84/042; H04W 12/35; H04W 48/00; H04W 76/25; H04W 8/183; H04W 84/00; H04W 12/72; H04W 28/0215; H04W 4/60; H04W 76/11; H04W 40/22; H04W 76/18; H04W 80/10; H04W 12/0431; H04W 12/08; H04W 12/082; H04W 12/084; H04W 12/086; H04W 16/02; H04W 24/02; H04W 28/0263; H04W 36/08; H04W 4/08; H04W 4/44; H04W 48/02; H04W 48/08; H04W 48/16; H04W 48/20; H04W 60/06; H04W 76/16; H04W 76/19; H04W 76/27; H04W 76/40; H04W 8/005; H04W 8/02; H04W 8/08; H04W 8/20; H04W 8/26; H04W 84/06; H04W 88/08; H04W 4/20
See application file for complete search history.

(56) References Cited

U.S. PATENT DOCUMENTS

| | | | | |
|---|---|---|---|---|
| 11,564,079 | B2* | 1/2023 | Lee | H04L 67/51 |
| 11,627,522 | B2* | 4/2023 | Velev | H04W 48/18 |
| | | | | 455/435.1 |
| 2014/0273969 | A1 | 9/2014 | Zhang et al. | |
| 2017/0303259 | A1* | 10/2017 | Lee | H04W 28/16 |
| 2018/0270840 | A1 | 9/2018 | Griot et al. | |
| 2018/0324557 | A1 | 11/2018 | Faccin et al. | |
| 2018/0332523 | A1* | 11/2018 | Faccin | H04W 36/14 |
| 2018/0368061 | A1 | 12/2018 | Yu et al. | |
| 2019/0053148 | A1 | 2/2019 | Lee et al. | |
| 2019/0098618 | A1 | 3/2019 | Lee et al. | |
| 2019/0141606 | A1 | 5/2019 | Qiao et al. | |
| 2019/0150081 | A1 | 5/2019 | Qiao et al. | |
| 2019/0159015 | A1 | 5/2019 | Qiao et al. | |

OTHER PUBLICATIONS 5G 3GPP, "3rd Generation Partnership Project; Technical Specification Group Core Network and Terminals; Non-Access-Stratum (NAS) protocol for 5G System (5GS); Stage 3 (Release 15)", 3GPP TS 24.501 V0.1.0, Nov. 2017, pp. 1-16.

5G 3GPP, "3rd Generation Partnership Project; Technical Specification Group Services and System Aspects; Policy and Charging Control Framework for the 5G System; Stage 2 (Release 15)", 3GPP TS 23.503 V0.2.0, Sep. 2017, pp. 1-28.

LTE 3GPP, "3rd Generation Partnership Project; Technical Specification Group Services and System Aspects; Procedures for the 5G System; Stage 2 (Release 15)", 3GPP TS 23.502 V1.1.0, Sep. 2017, pp. 1-165.

5G 3GPP, "3rd Generation Partnership Project; Technical Specification Group Services and System Aspects; System Architecture for the 5G System; Stage 2 (Release 15)" 3GPP TS 23.501 V1.6.0, Dec. 2017, pp. 1-184.

Samsung Electronics et al., "Update of Solution #1.7: Solutions for MEANS via Slicing Group Indication", SA WG2 Meeting #S2-129 S2-1810296, Oct. 15-19, 2018.

* cited by examiner

NETWORK SLICE SELECTION ASSISTANCE INFORMATION CONFIGURATION

CROSS-REFERENCE TO RELATED APPLICATIONS

This application is a continuation application of U.S. Ser. No. 17/180,038 filed on Feb. 19, 2021, which is a continuation application of U.S. Ser. No. 16/228,283 filed on Dec. 20, 2018, which claims priority to U.S. Patent Application Ser. No. 62/609,642 entitled "PROVISIONING A MOBILE DEVICE WITH A NETWORK SLICING CONFIGURATION" and filed on Dec. 22, 2017 for Genadi Velev, all of which are incorporated herein by reference in their entirety.

FIELD

The subject matter disclosed herein relates generally to wireless communications and more particularly relates to network slice selection assistance information configuration.

BACKGROUND

The following abbreviations are herewith defined, at least some of which are referred to within the following description: Third Generation Partnership Project ("3GPP"), 5th Generation ("5G"), Positive-Acknowledgment ("ACK"), Access and Mobility Management Function ("AMF"), Access Point ("AP"), Binary Phase Shift Keying ("BPSK"), Base Station ("BS"), Buffer Status Report ("BSR"), Bandwidth ("BW"), Bandwidth Part ("BWP"), Carrier Aggregation ("CA"), Contention-Based Random Access ("CBRA"), Clear Channel Assessment ("CCA"), Cyclic Delay Diversity ("CDD"), Code Division Multiple Access ("CDMA"), Control Element ("CE"), Contention-Free Random Access ("CFRA"), Closed-Loop ("CL"), Coordinated Multipoint ("CoMP"), Cyclic Prefix ("CP"), Cyclical Redundancy Check ("CRC"), Channel State Information ("CSI"), Common Search Space ("CSS"), Control Resource Set ("CORESET"), Discrete Fourier Transform Spread ("DFTS"), Downlink Control Information ("DCI"), Downlink ("DL"), Demodulation Reference Signal ("DMRS"), Data Radio Bearer ("DRB"), Downlink Pilot Time Slot ("DwPTS"), Enhanced Clear Channel Assessment ("eCCA"), Enhanced Mobile Broadband ("eMBB"), Evolved Node B ("eNB"), Effective Isotropic Radiated Power ("EIRP"), European Telecommunications Standards Institute ("ETSI"), Frame Based Equipment ("FBE"), Frequency Division Duplex ("FDD"), Frequency Division Multiplexing ("FDM"), Frequency Division Multiple Access ("FDMA"), Frequency Division Orthogonal Cover Code ("FD-OCC"), 5G Node B or Next Generation Node B ("gNB"), General Packet Radio Services ("GPRS"), Guard Period ("GP"), Global System for Mobile Communications ("GSM"), Globally Unique Temporary UE Identifier ("GUTI"), Home AMF ("hAMF"), Hybrid Automatic Repeat Request ("HARQ"), Home Location Register ("HLR"), Home PLMN ("HPLMN"), Home Subscriber Server ("HSS"), Identity or Identifier ("ID"), Information Element ("IE"), International Mobile Equipment Identity ("IMEI"), International Mobile Subscriber Identity ("IMSI"), International Mobile Telecommunications ("IMT"), Internet-of-Things ("IoT"), Layer 2 ("L2"), Licensed Assisted Access ("LAA"), Load Based Equipment ("LBE"), Listen-Before-Talk ("LBT"), Logical Channel ("LCH"), Logical Channel Prioritization ("LCP"), Long Term Evolution ("LTE"), Multiple Access ("MA"), Medium Access Control ("MAC"), Multimedia Broadcast Multicast Services ("MBMS"), Modulation Coding Scheme ("MCS"), Master Information Block ("MIB"), Multiple Input Multiple Output ("MIMO"), Mobility Management ("MM"), Mobility Management Entity ("MME"), Mobile Network Operator ("MNO"), massive MTC ("mMTC"), Maximum Power Reduction ("MPR"), Machine Type Communication ("MTC"), Multi User Shared Access ("MUSA"), Non Access Stratum ("NAS"), Narrowband ("NB"), Negative-Acknowledgment ("NACK") or ("NAK"), Network Entity ("NE"), Network Function ("NF"), Non-Orthogonal Multiple Access ("NOMA"), New Radio ("NR"), Network Repository Function ("NRF"), Network Slice Instance ("NSI"), Network Slice Selection Assistance Information ("NSSAI"), Network Slice Selection Function ("NSSF"), Network Slice Selection Policy ("NSSP"), Operation and Maintenance System ("OAM"), Orthogonal Frequency Division Multiplexing ("OFDM"), Open-Loop ("OL"), Other System Information ("OSI"), Power Angular Spectrum ("PAS"), Physical Broadcast Channel ("PBCH"), Power Control ("PC"), Primary Cell ("PCell"), Policy Control Function (""PCF"), Physical Cell ID ("PCID"), Physical Downlink Control Channel ("PDCCH"), Packet Data Convergence Protocol ("PDCP"), Physical Downlink Shared Channel ("PDSCH"), Pattern Division Multiple Access ("PDMA"), Packet Data Unit ("PDU"), Physical Hybrid ARQ Indicator Channel ("PHICH"), Power Headroom ("PH"), Power Headroom Report ("PHR"), Physical Layer ("PHY"), Public Land Mobile Network ("PLMN"), Physical Random Access Channel ("PRACH"), Physical Resource Block ("PRB"), Physical Uplink Control Channel ("PUCCH"), Physical Uplink Shared Channel ("PUSCH"), Quasi Co-Located ("QCL"), Quality of Service ("QoS"), Quadrature Phase Shift Keying ("QPSK"), Registration Area ("RA"), Radio Access Network ("RAN"), Radio Access Technology ("RAT"), Random Access Procedure ("RACH"), Random Access Response ("RAR"), Radio Link Control ("RLC"), Radio Network Temporary Identifier ("RNTI"), Reference Signal ("RS"), Remaining Minimum System Information ("RMSI"), Radio Resource Control ("RRC"), Resource Spread Multiple Access ("RSMA"), Reference Signal Received Power ("RSRP"), Round Trip Time ("RTT"), Receive ("RX"), Sparse Code Multiple Access ("SCMA"), Scheduling Request ("SR"), Sounding Reference Signal ("SRS"), Single Carrier Frequency Division Multiple Access ("SC-FDMA"), Secondary Cell ("SCell"), Shared Channel ("SCH"), Sub-carrier Spacing ("SCS"), Service Data Unit ("SDU"), System Information Block ("SIB"), Subscriber Identity/Identification Module ("SIM"), Signal-to-Interference-Plus-Noise Ratio ("SINR"), Service Level Agreement ("SLA"), Session Management Function ("SMF"), Single Network Slice Selection Assistance Information ("S-NSSAI"), Synchronization Signal ("SS"), Synchronization Signal Block ("SSB"), Supplementary Uplink ("SUL"), Subscriber Permanent Identifier ("SUPI"), Tracking Area ("TA"), TA Indicator ("TAI"), Transport Block ("TB"), Transport Block Size ("TBS"), Time-Division Duplex ("TDD"), Time Division Multiplex ("TDM"), Time Division Orthogonal Cover Code ("TD-OCC"), Transmission Power Control ("TPC"), Transmission Reception Point ("TRP"), Transmission Time Interval ("TTI"), Transmit ("TX"), Uplink Control Information ("UCI"), Unified Data Management Function ("UDM"), Unified Data Repository ("UDR"), User Entity/Equipment (Mobile Terminal) ("UE"), Uplink ("UL"), Universal Mobile Telecommunications System ("UMTS"), User Plane ("UP"), Uplink Pilot Time Slot ("UpPTS"), Ultra-reliability and Low-latency Communications ("URLLC"), UE Route Selection Policy ("URSP"), Visiting AMF ("vAMF"), Visiting NSSF ("vNSSF"), Visiting PLMN ("VPLMN"), and Worldwide Interoperability for Microwave Access ("WiMAX").

In certain wireless communications networks, a network slicing configuration may be used. In such networks, a device may not know the network slicing configuration to use.

BRIEF SUMMARY

Methods for NSSAI configuration are disclosed. Apparatuses and systems also perform the functions of the apparatus. One embodiment of a method includes determining a configured network slice selection assistance information for a public land mobile network for a remote unit in response to a trigger from an access and mobility management function. In such an embodiment, the access and mobility management function, a network slice selection function, or a combination thereof determines the configured network slice selection assistance information. In certain embodiments, the method includes providing the configured network slice selection assistance information to the remote unit via the access and mobility management function.

One apparatus for NSSAI configuration includes a processor that determines a configured network slice selection assistance information for a public land mobile network for a remote unit in response to a trigger from an access and mobility management function. In such an embodiment, the access and mobility management function, a network slice selection function, or a combination thereof determines the configured network slice selection assistance information. In certain embodiments, the apparatus includes a transmitter that provides the configured network slice selection assistance information to the remote unit via the access and mobility management function.

One method for NSSAI configuration includes receiving, at a remote unit, a configured network slice selection assistance information for a public land mobile network via an access and mobility management function. In such an embodiment, the access and mobility management function, a network slice selection function, or a combination thereof determines the configured network slice selection assistance information in response to a trigger from the access and mobility management function.

One apparatus for NSSAI configuration includes a receiver that receives a configured network slice selection assistance information for a public land mobile network via an access and mobility management function. In such an embodiment, the access and mobility management function, a network slice selection function, or a combination thereof determines the configured network slice selection assistance information in response to a trigger from the access and mobility management function.

One method for NSSAI configuration includes receiving, at a remote unit, first configured network slice selection assistance information for a first public land mobile network. In some embodiments, the method includes storing, at the remote unit, the first configured network slice selection assistance information for the first public land mobile network. In certain embodiments, the method includes transmitting a first acknowledgment in response to receiving the first configured network slice selection assistance information. In such embodiments, the first acknowledgment indicates that the first configured network slice selection assistance information was received. In various embodiments, the method includes receiving, at the remote unit, second configured network slice selection assistance information for a second public land mobile network. In one embodiment, the method includes storing, at the remote unit, the second configured network slice selection assistance information for the second public land mobile network. In some embodiments, the method includes transmitting a second acknowledgment in response to receiving the second configured network slice selection assistance information. In such embodiments, the second acknowledgment indicates that the second configured network slice selection assistance information was received.

One apparatus for NSSAI configuration includes a receiver that receives first configured network slice selection assistance information for a first public land mobile network. In some embodiments, the apparatus includes a processor that stores the first configured network slice selection assistance information for the first public land mobile network. In certain embodiments, the apparatus includes a transmitter that transmits a first acknowledgment in response to receiving the first configured network slice selection assistance information. In such embodiments, the first acknowledgment indicates that the first configured network slice selection assistance information was received. In various embodiments, the receiver receives second configured network slice selection assistance information for a second public land mobile network; the processor stores the second configured network slice selection assistance information for the second public land mobile network; and the transmitter transmits a second acknowledgment in response to receiving the second configured network slice selection assistance information. In such embodiments, the second acknowledgment indicates that the second configured network slice selection assistance information was received.

One method for NSSAI configuration includes determining, within a unified data management function, a default network slice selection assistance information for a public land mobile network for a remote unit. In some embodiments, the method includes providing the default network slice selection assistance information to the remote unit.

One apparatus for NSSAI configuration includes a processor that determines, within a unified data management function, a default network slice selection assistance information for a public land mobile network for a remote unit. In various embodiments, the apparatus includes a transmitter that provides the default network slice selection assistance information to the remote unit.

One method for NSSAI configuration includes receiving, at a remote unit, a default network slice selection assistance information for a public land mobile network. In such an embodiment, a unified data management function determines the default network slice selection assistance information and provides the default network slice selection assistance information to the remote unit.

One apparatus for NSSAI configuration includes a receiver that receives a default network slice selection assistance information for a public land mobile network. In such an embodiment, a unified data management function determines the default network slice selection assistance information and provides the default network slice selection assistance information to the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
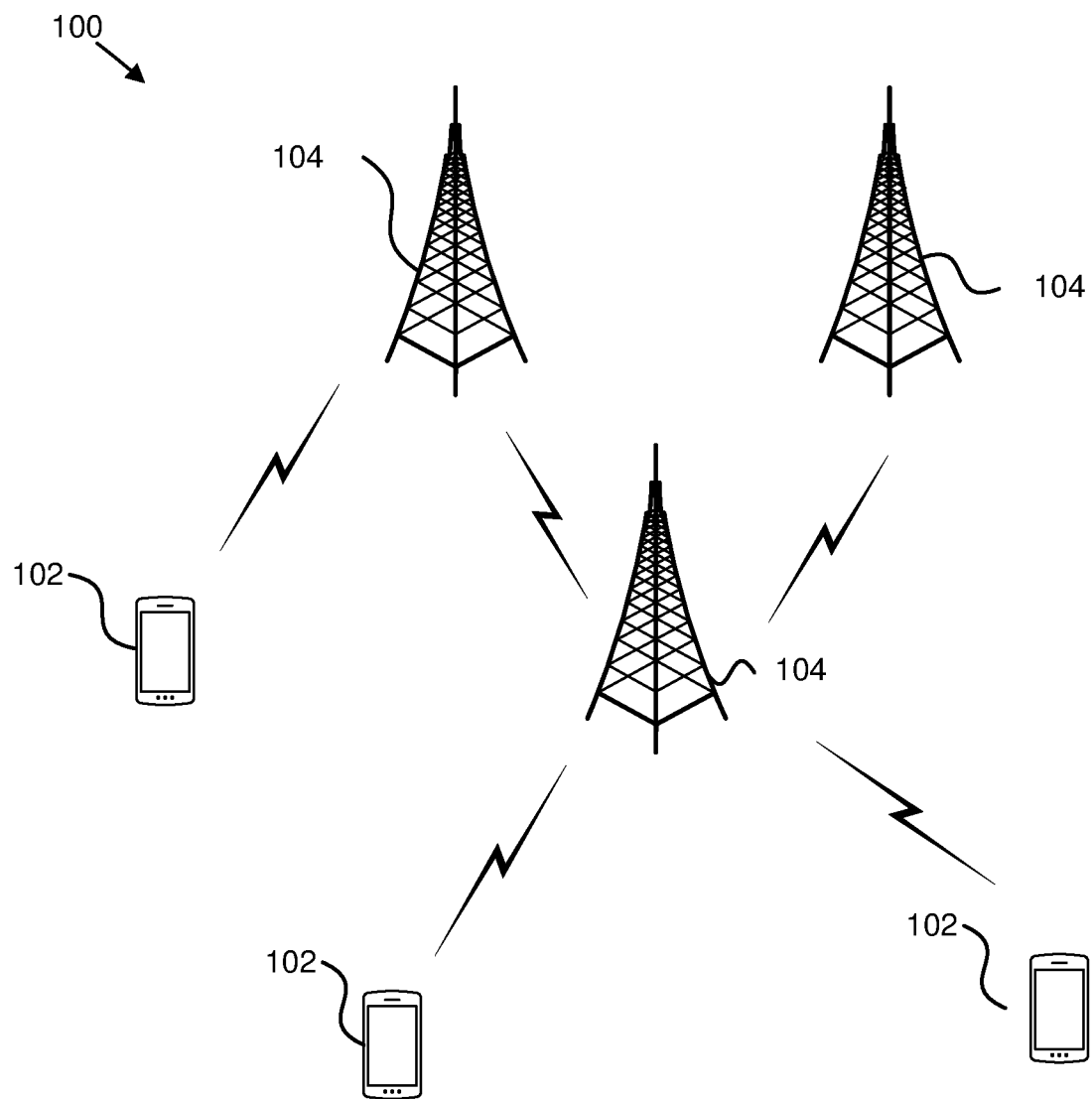
FIG. 1 is a schematic block diagram illustrating one embodiment of a wireless communication system for NSSAI configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for NSSAI configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals.

The network units 104 may be distributed over a geographic region. In certain embodiments, a network unit 104 may also be referred to as an access point, an access terminal, a base, a base station, a Node-B, an eNB, a gNB, a Home Node-B, a relay node, a device, a core network, an aerial server, a radio access node, an AP, NR, a network entity, an AMF, a UDM, a UDR, a UDM/UDR, a PCF, a RAN, an NSSF, or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in 3GPP, wherein the network unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, IEEE 802.11 variants, GSM, GPRS, UMTS, LTE variants, CDMA2000, Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In one embodiment, a remote unit 102 may receive a configured network slice selection assistance information for a public land mobile network via an access and mobility management function. In such an embodiment, the access and mobility management function, a network slice selection function, or a combination thereof determines the configured network slice selection assistance information in response to a trigger from the access and mobility management function. Accordingly, the remote unit 102 may be used for NSSAI configuration.

In certain embodiments, a network unit 104 may determine a configured network slice selection assistance information for a public land mobile network for a remote unit 102 in response to a trigger from an access and mobility management function. In such an embodiment, the access and mobility management function, a network slice selection function, or a combination thereof determines the configured network slice selection assistance information. In certain embodiments, the network unit 104 may provide the configured network slice selection assistance information to the remote unit 102 via the access and mobility management function. Accordingly, the network unit 104 may be used for NSSAI configuration.

In one embodiment, a remote unit 102 may receive first configured network slice selection assistance information for a first public land mobile network. In some embodiments, the remote unit 102 may store the first configured network slice selection assistance information for the first public land mobile network. In certain embodiments, the remote unit 102 may transmit a first acknowledgment in response to receiving the first configured network slice selection assistance information. In such embodiments, the first acknowledgment indicates that the first configured network slice selection assistance information was received. In various embodiments, the remote unit 102 may receive second configured network slice selection assistance information for a second public land mobile network. In one embodiment, the remote unit 102 may store the second configured network slice selection assistance information for the second public land mobile network. In some embodiments, the remote unit 102 may transmit a second acknowledgment in response to receiving the second configured network slice selection assistance information. In such embodiments, the second acknowledgment indicates that the second configured network slice selection assistance information was received. Accordingly, the remote unit 102 may be used for NSSAI configuration.

In certain embodiments, a network unit 104 may determine, within a unified data management function, a default network slice selection assistance information for a public land mobile network for a remote unit 102. In some embodiments, the network unit 104 may provide the default network slice selection assistance information to the remote unit 102. Accordingly, the network unit 104 may be used for NSSAI configuration.

In one embodiment, a remote unit 102 may receive a default network slice selection assistance information for a public land mobile network. In such an embodiment, a unified data management function determines the default network slice selection assistance information and provides the default network slice selection assistance information to the remote unit 102. Accordingly, the remote unit 102 may be used for NSSAI configuration.

Figure 2:
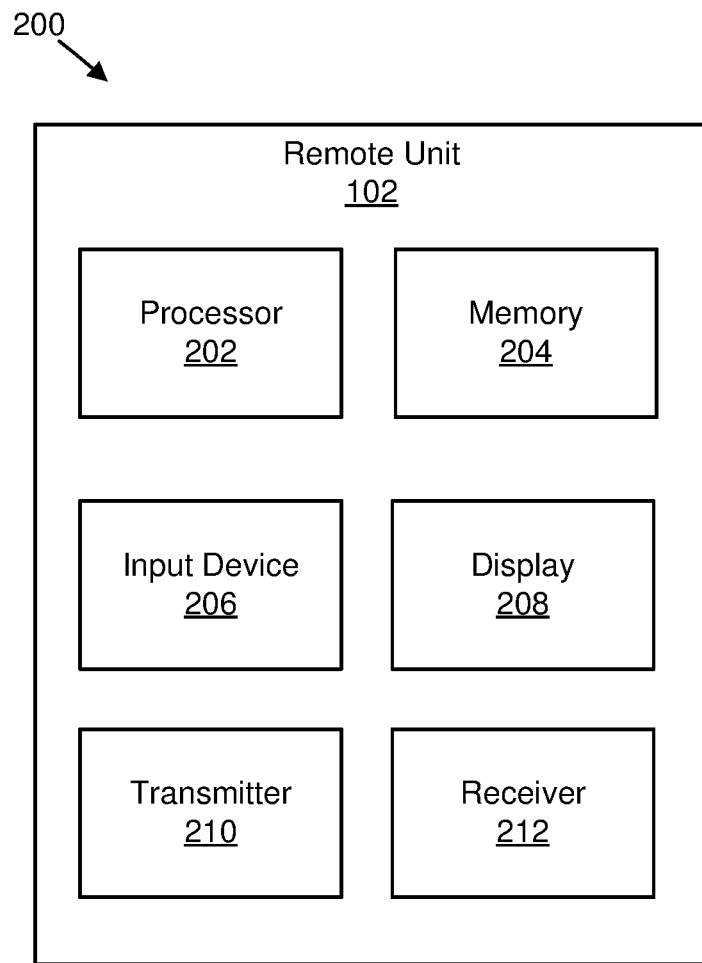
FIG. 2 is a schematic block diagram illustrating one embodiment of an apparatus that may be used for NSSAI configuration.

FIG. 2 depicts one embodiment of an apparatus 200 that may be used for NSSAI configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. In various embodiments, the processor 202 may: store a first configured network slice selection assistance information for a first public land mobile network; and store a second configured network slice selection assistance information for the second public land mobile network. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the network unit 104 and the receiver 212 is used to receive DL communication signals from the network unit 104, as described herein. In some embodiments, the receiver 212 receives a configured network slice selection assistance information for a public land mobile network via an access and mobility management function. In such an embodiment, the access and mobility management function, a network slice selection function, or a combination thereof determines the configured network slice selection assistance information in response to a trigger from the access and mobility management function.

In some embodiments, the receiver 212 receives first configured network slice selection assistance information for a first public land mobile network. In certain embodiments, the transmitter 210 transmits a first acknowledgment in response to receiving the first configured network slice selection assistance information. In such embodiments, the first acknowledgment indicates that the first configured network slice selection assistance information was received. In various embodiments, the receiver 212 receives second configured network slice selection assistance information for a second public land mobile network. In some embodiments, the transmitter 210 transmits a second acknowledgment in response to receiving the second configured network slice selection assistance information. In such embodiments, the second acknowledgment indicates that the second configured network slice selection assistance information was received.

In various embodiments, the receiver 212 receives a default network slice selection assistance information for a public land mobile network. In such an embodiment, a unified data management function determines the default network slice selection assistance information and provides the default network slice selection assistance information to the remote unit 102.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
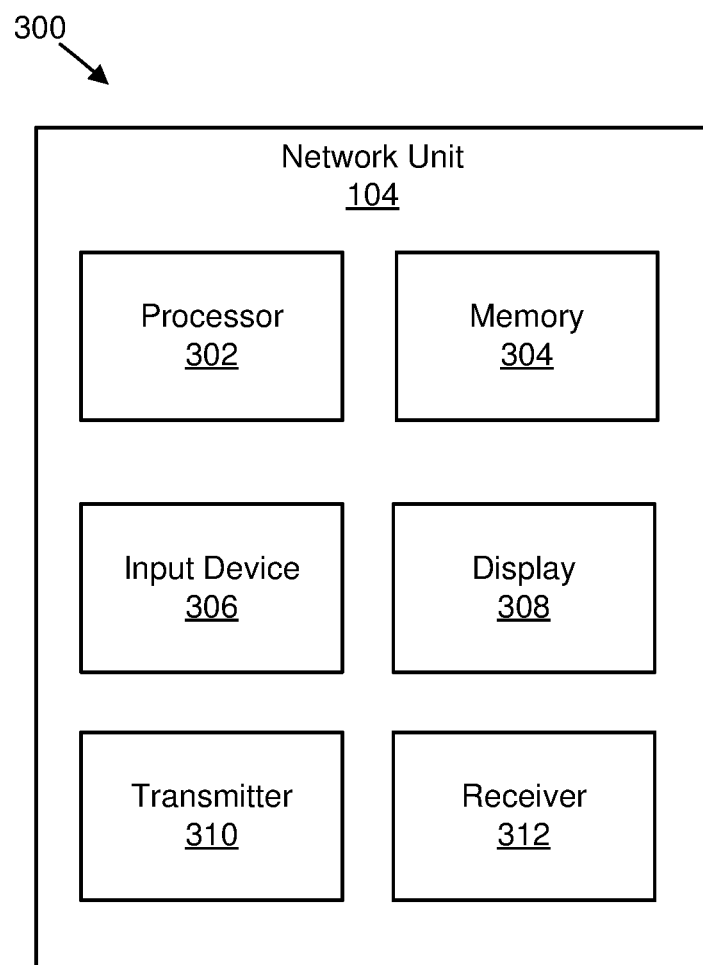
FIG. 3 is a schematic block diagram illustrating one embodiment of an apparatus that may be used for NSSAI configuration.

FIG. 3 depicts one embodiment of an apparatus 300 that may be used for NSSAI configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the processor 302 determines a configured network slice selection assistance information for a public land mobile network for a remote unit 102 in response to a trigger from an access and mobility management function. In such an embodiment, the access and mobility management function, a network slice selection function, or a combination thereof determines the configured network slice selection assistance information. In certain embodiments, the transmitter 310 provides the configured network slice selection assistance information to the remote unit 102 via the access and mobility management function.

In some embodiments, the processor 302 determines, within a unified data management function, a default network slice selection assistance information for a public land mobile network for a remote unit 102. In various embodiments, the transmitter 310 provides the default network slice selection assistance information to the remote unit 102.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In some embodiments, a network may be partitioned into one or more network slices and a mobile network operator may configure the one or more network slices to serve one or more particular services or service providers. A UE may be subscribed to services served by multiple network slices.

One example of a network slice configuration for a UE is as follows:

Configured NSSAI for HPLMN: [S-NSSAI-1, S-NSSAI-2, S-NSSAI-3]

Configured NSSAI for VPLMN-1: [S-NSSAI-1, S-NSSAI-4]

Mapping [S-NSSAI-4 ==S-NSSAI-2, S-NSSAI-3]

Configured NSSAI for VPLMN-2: [S-NSSAI-5, S-NSSAI-6]

Mapping [S-NSSAI-5 ==S-NSSAI-1]

Mapping [S-NSSAI-6 ==S-NSSAI-2, S-NSSAI-3]

It should be noted that this example is for a configured NSSAI, for allowed NSSAI there may be independent IEs signaled to the UE in a registration accept message.

As used herein, "network slice configuration," "network slicing configuration," and/or "slice configuration information" may mean that a UE is provided with: a configured NSSAI for a HPLMN; and/or one or more configured NSSAIs for other PLMNs associated with mapping of each S-NSSAI of the configured NSSAI to the HPLMN S-NSSAI values. In some embodiments, a UE provisioning performed by a HPLMN is referred to as a default UE network slice configuration and may contain configured NSSAI for the HPLMN and one or more default configured NSSAIs for other PLMNs. Any other serving PLMN (e.g., VPLMN) may provide additional network slice configurations to the UE (e.g. configured NSSAI for a serving PLMN) only applicable to the serving PLMN.

As used herein, "subscription information" may mean subscription data which may contain one or more parameters stored in a UDR. In some embodiments, subscription information may include policy data and/or structured data for internal exposure and/or external exposure. The subscription information may be downloaded in a UDM, and the UDM may send the subscription information to other NFs such as AMF, SMF, and so forth. Therefore, the term UDM/UDR may be used to refer to the combined functions of the UDR and the UDM.

In certain embodiments, if a UE does not have a configured NSSAI for a particular serving PLMN, the UE may not send a requested NSSAI in a registration request message (e.g., with an initial registration). After a serving AMF authenticates the UE and downloads the UE's subscription information from the UDM, the serving AMF knows the subscribed S-NSSAIs for this UE. If there are more than one subscribed S-NSSAIs, it may be beneficial to perform UE slice configuration in the UE (e.g., providing the UE with a configured NSSAI).

In various embodiments, not including a requested NSSAI is an indication to a serving AMF that a UE does not have a configured NSSAI for a PLMN to which the UE is attempting registration.

In some embodiments, an NSSF is an entity (e.g., NF) in a 5G system that has overview about slice configuration in an entire PLMN. In such embodiments, the NSSF may support the following functionality: selecting a set of network slice instances to serve a UE; determining an allowed NSSAI and, if needed, a mapping to subscribed S-NSSAIs; and/or determining an AMF set to be used to serve the UE, or, based on configuration, a list of candidate AMFs (e.g., by querying the NRF); and/or determining the NRF to be used for a particular network slice instance.

In certain embodiments, UE subscription information in a UDM/UDR keeps track (e.g., using a flag and/or a parameter) of whether a UE has been provisioned with a configured NSSAI for a HPLMN and/or one or more configured NSSAIs for VPLMNs. If the UDM/UDR uses a flag and/or a parameter, the flag and/or the parameter may be configured and/or updated as follows: 1) after the UE has been successfully provided one or more configured NSSAIs by an AMF, the AMF may update the UDM/UDR with information indicating that the one or more configured NSSAIs for the HPLMN and/or VPLMNs has been provided; and/or 2) the UDM/UDR may create, store, and/or signal to the AMF (e.g., within a subscription retrieval or within a separate procedure) subscribed S-NSSAI for the HPLMN and/or configured NSSAIs for one or more VPLMNs.

In various embodiments, if subscribed S-NSSAIs in a UDM/UDR change, the UDM/UDR may trigger a subscription information update procedure that includes transmitting a message to a serving AMF (e.g., if the serving AMF is registered at the UDM/UDR) and may request a UE network slicing configuration update. In such embodiments, the UDM/UDR may indicate to the serving AMF at least one of the following: 1) an indication that a configured NSSAI for a HPLMN is no longer valid (in such a case, the AMF may construct a new configured NSSAI for the HPLMN based on a list of subscribed S-NSSAIs); and/or 2) a new subscribed S-NSSAI for the HPLMN and/or one or more configured NSSAIs for one or more VPLMNs. In such embodiments, the AMF may update a UE network slicing configuration using a UE configuration update procedure.

In some embodiments, if a requested NSSAI is not included (or is equal to zero) in a registration request message, then: 1) in a non-roaming configuration, if a configured S-NSSAI for a HPLMN is not received from a UDM/UDR, an AMF determines that a UE should be provided with a network slicing configuration and the AMF derives a configured NSSAI for the HPLMN based on subscribed NSSAIs (e.g., the configured NSSAI for the HPLMN contains a full list of subscribed NSSAIs)—the configured NSSAI for the HPLMN may also include an indication for default S-NSSAIs and/or the S-NSSAIs may be in priority order; 2) in a roaming configuration, the AMF may determine that either there is no configured NSSAI or that the configured NSSAI needs to be updated for a serving PLMN, therefore, the AMF either (1) creates and/or derives a new configured NSSAI for the serving PLMN by itself or (2) request the NSSF to derive a configured NSSAI for this UE.

In certain embodiments, if a requested NSSAI is included in a registration request message but one or more of S-NSSAI values are not known to an AMF, the AMF may request information from an NSSF about resolution and the AMF (together with NSSF) may determine that a configured NSSAI for the PLMN is not correct and needs to be updated.

In various embodiments, an NSSF may determine a configured NSSAI for a UE and mapping of the configured NSSAI for a HPLMN. In such embodiments, the NSSF may not need to derive the configured NSSAI every time if an AMF requests an NSSAI from the NSSF (e.g., request for allowed NSSAI, request for the configured NSSAI); however, the AMF may include an extra indication that indicates whether the NSSF is to derive the configured NSSAI. In such embodiments, the indication to the NSSF may include: subscribed S-NSSAIs; a PLMN ID of a SUPI, a request from the AMF to derive the configured NSSAI, a request from the AMF for allowed NSSAI, and/or a request from the AMF for the configured NSSAI for the HPLMN.

In one embodiment, a UE may be provided and/or updated with a network slicing configuration for a HPLMN (e.g., provided a configured NSSAI for the HPLMN). In such an embodiment, an AMF may determine whether to provide and/or update the UE network slicing configuration. In certain embodiments, a UDM/UDR provides new information (e.g., parameters, indications) to an AMF to assist in updating the UE network slicing configuration. In some embodiments, after successful UE configuration, an AMF may update a UDM/UDR with a message (e.g., 'UE Provisioned with Configured NSSAI for the HPLMN') after the UE has been successfully provided a configured NSSAI for a HPLMN.

In various embodiments, providing and/or updating a UE with a network slicing configuration for a HPLMN may be referred to as a default UE network slice configuration. In such embodiments, the default network slice configuration contains at least a configured NSSAI for the HPLMN and may contain other configured NSSAI which may apply either to one PLMN or to all PLMNs that do not have a specific configured NSSAI. In some embodiments, such as in non-roaming configurations, an AMF may create a configured NSSAI based on subscribed S-NSSAIs as received from a UDM. In various embodiments, a HPLMN may provide a UE with configured NSSAI for other PLMNs.

In certain embodiments, because an AMF may not know to which other PLMN a specific configured NSSAI can apply, a UDM/UDR may indicate this information (e.g., a default configured NSSAI for any VPLMN) to the AMF.

In some embodiments, such as in a roaming configuration, if a change to any subscribed S-NSSAIs for a UE occurs in a UDM/UDR, then a serving vAMF and/or vNSSF may update a configured NSSAI for a VPLMN, but the Serving vAMF may not be able to update the configured NSSAI for a HPLMN (e.g., because the vAMF may not have a complete list of subscribed S-NSSAIs). Therefore, in a roaming configuration, a UDM/UDR may send a "Configured NSSAI for the HPLMN" as a transparent container to a vAMF and the vAMF may perform a UE configuration update procedure to update the 'Configured NSSAI for the HPLMN' for the UE together with the 'Configured NSSAI for the VPLMN'.

For example, a UDM/UDR may create and/or store the following network slice configuration information which may be stored in the UE's subscription information:
Configured NSSAI for HPLMN: [S-NSSAI-1, S-NSSAI-2, S-NSSAI-3]
(Default) Configured NSSAI for any VPLMN: [S-NSSAI-1, S-NSSAI-4]
Mapping [S-NSSAI-4 ==S-NSSAI-2]

In certain embodiments, in a non-roaming configuration, a UDM/UDR may send a configured NSSAI for any VPLMN (e.g., a default configured NSSAI for any VPLMN) and/or may send a list of PLMNs to which the configured NSSAI for a HPLMN applies. In such embodiments, the configured NSSAI for the HPLMN may be created at the AMF. In various embodiments, such as in a roaming configuration, a UDM/UDR may send a configured NSSAI for a HPLMN and/or a default configured NSSAI for any VPLMN as one or more transparent containers to a vAMF.

Figure 4:
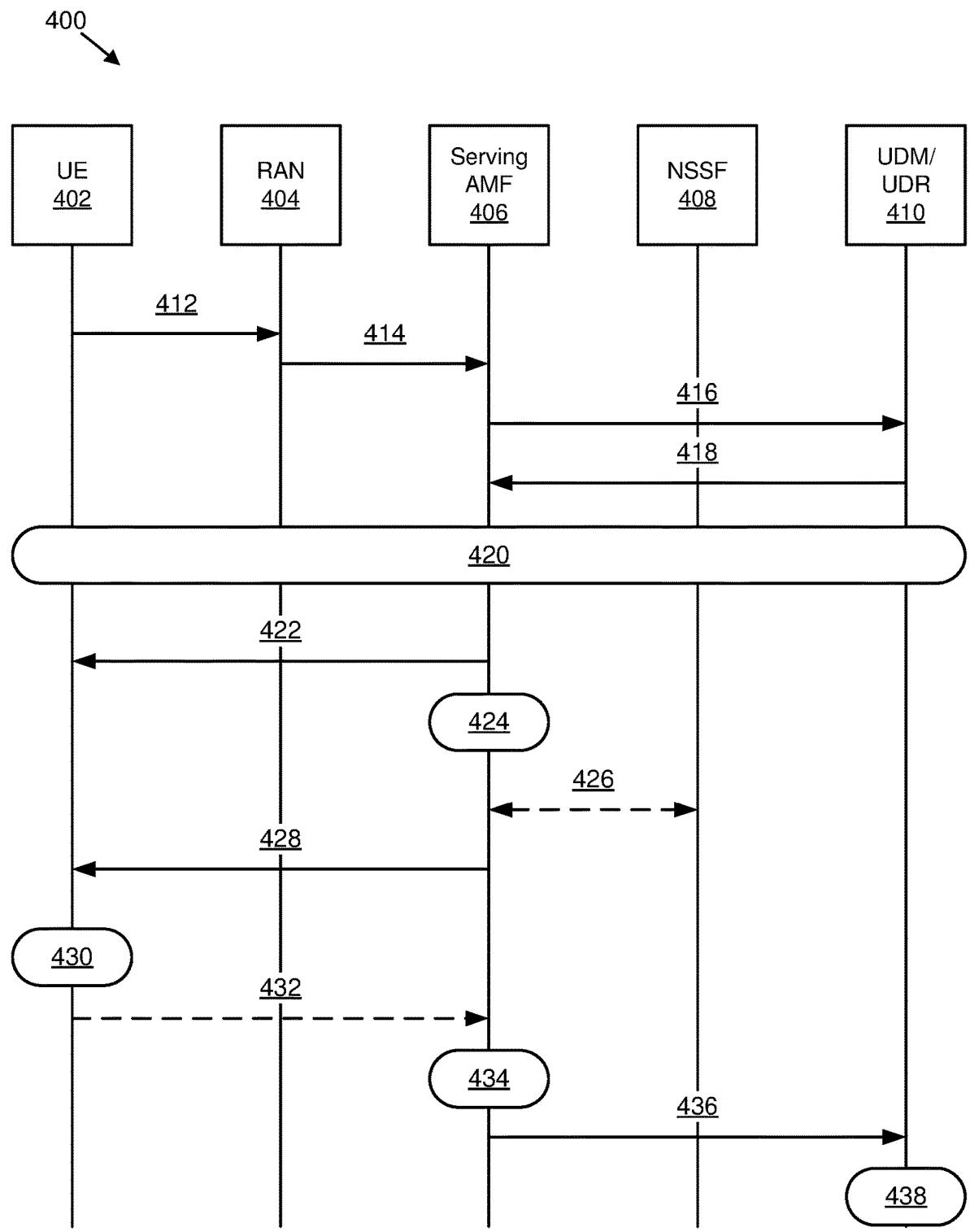
FIG. 4 is a schematic block diagram illustrating one embodiment of communications for default UE provisioning with a configured NSSAI.

FIG. 4 is a schematic block diagram illustrating one embodiment of communications 400 for default UE provisioning with a configured NSSAI. The communications 400 includes messages transmitted between a UE 402, a RAN 404, a serving AMF 406, an NSSF 408, and a UDM/UDR 410. As may be appreciated, each communication described herein may include one or more messages.

In a first communication 412 transmitted from the UE 402 to the RAN 404, the UE 402 may send a NAS registration request message to the RAN 404 that may include: a UE ID (e.g., SUPI); a registration type (e.g., initial, mobility), and/or a requested NSSAI. The NAS registration request message may be encapsulated in RRC signaling. In some embodiments, the RRC signaling contains a requested NSSAI.

In a second communication 414 transmitted from the RAN 404 to the serving AMF 406, the RAN 404 may send the NAS registration request message to the serving AMF 406. There may be multiple ways for the serving AMF 406 to determine whether the UE 402 is provided with a configured NSSAI for a serving PLMN: 1) if a requested NSSAI is not included (or empty) in the NAS registration request message, then this may be an implicit indication to the serving AMF 406 that the UE 402 does not have a configured NSSAI for the serving PLMN; 2) the UE 402 may include an explicit indication in the NAS registration request message that there is no configured NSSAI for the serving PLMN (the UE 402 may determine that there is no configured NSSAI based on an internally stored slice configuration and a PLMN ID to which the UE 402 is attempting to register and/or attach. If there is no stored configured NSSAI for the PLMN ID, then the UE 402 determines that there is no configured NSSAI for the serving PLMN and includes the indication in the NAS registration request message. For example, the UE 402 may include a 'Configured NS SAI availability' indication); and/or 3) based on an explicit indication from a UDM/UDR (as described in a fourth communication 418).

In a third communication 416 transmitted from the serving AMF 406 to the UDM/UDR 410, the serving AMF 406 may request the UE subscription information from the UDM/UDR 410 via a UE subscription request. For example, the serving AMF 406 may register with the UDM/UDR 410 using a Nudm_UECM_Registration service.

In the fourth communication 418 transmitted from the UDM/UDR 410 to the serving AMF 406, the serving AMF 406 may retrieve access and mobility subscription data and SMF selection subscription data using a service Nudm_SDM_Get, for example. The information of the fourth communication 418 may be sent either in a subscription response message or in a separate message from the UDM/UDR 410 to the serving AMF 406 (e.g., a message specific for UE configuration information). The information of the fourth communication 418 may include:

1) an indication and/or parameter about whether a configured NSSAI for a HPLMN has been provided to the UE 402. For example, this indication and/or parameter may be called 'Configured NSSAI for HPLMN' or any other name expressing the same or a similar meaning. For example, this can be an IE having different values (e.g., 'Configured NSSAI for HPLMN Provisioned'=TRUE (or FALSE)). In an initial registration procedure of the UE 402 in a PLMN, it may be assumed that the UE 402 is not configured with any slicing information (e.g., no configured NSSAI for the HPLMN). In this case, the indication may be 'Configured NSSAI for HPLMN Provisioned'=FALSE (i.e., the serving AMF 406 learns that the UE 402 has no configured NSSAI for the HPLMN). In some embodiments, the indication and/or parameter may be sent only to AMFs in a VPLMN (assuming that the AMF in the HPLMN can create the configured NSSAI for the HPLMN based on the list of subscribed S-NSSAIs);

2) a list of one or more configured NASSAIs for one or more PLMNs (e.g., that the UDM/UDR 410 derives and/or stores) For example, the UDM/UDR 410 may send a list such as: configured NSSAI for HPLMN; configured NSSAI for VPLMN1; configured NSSAI for VPLMN2; and so forth. The UDM/UDR 410 may be able to know a configured NSSAI for VPLMN1 and/or VPLMN2 based on SLAs between the PLMNs. In addition, the UDM/UDR 410 may send a mapping of configured NSSAI per VPLMN (e.g., containing a mapping of the configured NSSAI from the serving PLMN to the configured NSSAI for the HPLMN). One particular example of what information the UDM/UDR 410 may signal to the serving AMF 406 network slicing configuration information (or configured NSSAIs for PLMNs) is described in relation to element 430 below;

3) an indication of whether an NSSP has been provisioned in the UE 402. For example, this indication may be called 'NSSP provisioned in the UE' indication or any other name expressing same or similar meaning. This indication may be set (e.g., set to TRUE, set to "1") if the UE 402 has already been provided with URSP containing NSSP; and/or 4) a device ID and/or equipment ID (e.g., IMEI) to indicate to the serving AMF 406 for which device IDs the network slicing configuration (e.g., configured NSSAI for HPLMN, VPLMN, and/or NSSP) has been already performed.

The information signaled from the UDM/UDR 410 to the serving AMF 406 described herein may be optionally included depending on the UDM/UDR 410 configuration (or on MNO preferences, network policies, and/or network configuration). Moreover, without the information from the UDM/UDR 410, the serving AMF 406 may decide that network slicing configuration (e.g., configured NSSAI for the HPLMN) is to be provisioned in the UE 402 based on that (1) the UE 402 has not included a requested NSSAI in the registration request message and (2) there are at least one or more subscribed S-NSSAIs in the UE subscription information.

The UDM/UDR 410 may also indicate to the serving AMF 406 (e.g., in the HPLMN) a list of PLMN IDs to which subscribed S-NSSAIs are applicable. This indication may be called, for example, 'Applicability of Subscribed S-NSSAIs to PLMN(s)'. This indication may also indicate 'all PLMNs' for which no other configured NSSAI is provided, in which case the configured NSSAI may be a default configured NSSAI for any VPLMN. This indication may enable the serving AMF 406 to indicate to the UE 402 to which other PLMNs, besides the HPLMN, the configured NSSAI for the HPLMN is applicable.

In a fifth communication 420 between the UE 402, the RAN 404, the serving AMF 406, the NSSF 408, and/or the UDM/UDR 410, messages may be sent based on the registration procedure as described in TS 23.502.

In a sixth communication 422 transmitted from the serving AMF 406 to the UE 402, the serving AMF 406 may provide the UE 402 with the configured NSSAI for the HPLMN. In some embodiments, the serving AMF 406 may create an IE called configured NSSAI which includes all subscribed S-NSSAIs obtained from the UDM/UDR 410 via the third communication 416 and the fourth communication 418.

The serving AMF 406 may determine 424 whether to provide the configured NSSAI for HPLMN based on at least one of the following conditions:

1) the serving AMF 406 may take into consideration information about whether the UE 406 is provided with configured NSSAI for a current PLMN (e.g., HPLMN). The serving AMF 406 may receive this information from NFs such as a PCF. If the information is negative (e.g., meaning that the UE 402 hasn't been provided the configured NSSAI for HPLMN), then the serving AMF 406 may decide to provide the configured NSSAI for HPLMN via communications 428 through 438. If the information is positive (e.g., meaning that the UE 402 has been provided the configured NSSAI for HPLMN), then the serving AMF 406 may decide to omit communications 428 through 438;

2) the serving AMF 406 may take into consideration information about whether the UE 406 is provided with NSSP. The serving AMF 406 may receive this information from NFs such as a PCF. If this information is negative (e.g., meaning that the UE 402 hasn't been provided with NSSP), then the serving AMF 406 may decide to provide the UE 402 with the configured NSSAI. In some embodiments, the configured NSSAI contains a single S-NSSAI value which may be a default S-NSSAI from the list of subscribed S-NSSAIs. The serving AMF 406 may then perform communications 428 through 438. If the information is positive (e.g., meaning that the UE 402 has been provided with NSSP), then the serving AMF 406 may decide to provide the UE with the configured NSSAI. In various embodiments, the configured NSSAI contains a full list of subscribed S-NSSAIs. The serving AMF 406 may then perform communications 428 through 438;

3) the serving AMF 406 may take into consideration a device ID and/or an equipment ID corresponding to providing the configured NSSAI to the UE 402. If the serving AMF 406 determines that a current device ID is different from the device ID as received in the fourth communication 418, then the serving AMF 406 may decide to provide the configured NSSAI to the UE 402 and perform communications 428 through 438. If the serving AMF 406 determines that the current device ID is the same as the device ID as received in the fourth communication 418 and the UE 402 has been already provided with the configured NSAAI, then the serving AMF 406 may decide to omit communications 428 through 438; and/or 4) if the serving AMF 406 receives configured NSSAI for other PLMNs in the fourth communication 418, the serving AMF 406 may not modify IEs (e.g., they are handled like a transparent container). Because the UDM/UDR 410 may not know slice specific SLAs with corresponding roaming partners, but the NSSF 408 may know such information, in a possible seventh communication 426 between the serving AMF 406 and the NSSF 408, the serving AMF 406 may enquire the NSSF 408 about received 'Configured NSSAI for other PLMN(s)' information in order to obtain mapping information of the configured NSSAI for other PLMNs to the configured NSSAI for HPLMN. The serving AMF 406 may include the information as received from the UDM/UDR 410 in the communication 428.

In an eighth communication 428 from the serving AMF 406 to the UE 402, the serving AMF 406 initiates a UE configuration update procedure to configure the UE 402 with configured NSSAI for the HPLMN and other PLMNs. Specifically, the serving AMF 406 may send a UE configuration update command message. The configured NSSAI IE may contain multiple fields (e.g., multiple S-NSSAI values and additional PLMN IDs for which the Configured NSSAI applies). The configured NSSAI IE may contain a list of S-NSSAIs in priority order (e.g., the first occurring S-NSSAI may be used in the requested NSSAI if there is no NSSP configured in the UE 402).

The UE 402 may store 430 the network slicing configuration information (e.g., configured NSSAIs and/or applicable PLMN IDs) in non-volatile memory. One example of how this information may be stored is as follows:

Configured NSSAI for HPLMN: [S-NSSAI-1, S-NSSAI-2, S-NSSAI-3]

(Default) Configured NSSAI for any VPLMN: [S-NSSAI-1, S-NSSAI-4]

Mapping [S-NSSAI-4=S-NSSAI-2]

In this example, the S-NSSAI-1, the S-NSSAI-2, and the S-NSSAI-3 may be values used in the HPLMN, whereas the values S-NSSAI-2 and S-NSSAI-3 may be PLMN-specific values. The S-NSSAI-1 may be a default S-NSSAI. The configured NSSAI for any VPLMN may be used by the UE 402 for any VPLMN which does not provide explicit new configured NSSAI. In this example the S-NSSAI-4 is a standardized value that maps to the PLMN-specific values S-NSSAI-2 and S-NSSAI-3. In this example, it is assumed that the UE's NSSP may include all values S-NSSAI-1, S-NSSAI-2, S-NSSAI-3. Some applications may map to S-NSSAI-3 as a higher priority mapping and S-NSSAI-1 as a lower priority mapping (e.g., if S-NSSAI-3 is not part of allowed NSSAI). Moreover, the mapping information (e.g., S-NSSAI-4=S-NSSAI-2) may originate from the NSSF.

In a possible ninth communication 432 from the UE 402 to the serving AMF 406, the UE 402 may respond to the eighth communication 428 with a UE configuration update complete message to confirm the reception and successful network slicing configuration in the UE 402.

The serving AMF 406 may update 434 its information to indicate that the UE 402 has been provided the configured NSSAI.

In a tenth communication 436 from the serving AMF 406 to the UDM/UDR 410, the serving AMF 406 may initiate a procedure to perform a UE subscription information update to inform the UDM/UDR 410 that the UE 402 has been provided the configured NSSAI for the HPLMN. The serving AMF 406 may inform the UDM/UDR 410 about whether the whole list of subscribed S-NSSAIs has been provided to the UE 402, or whether only a single default S-NSSAI value has been provided to the UE 402. In addition, the serving AMF 406 may include a device ID and/or an equipment ID (e.g. IMEI), so that the UDM/UDR 410 knows and stores the device ID and/or the equipment ID to which the configured NSSAI has been provided. Accordingly, the device ID and/or the equipment ID may be used by the UDM/UDR 410 to determine whether a new device is used with the same subscription profile (e.g., with the same SIM card). The UDM/UDR 410 can either create a new entry for providing the configured NSSAI to a device having the device ID, or update an existing entry for the device ID.

The UDM/UDR 410 may update 438 the UE subscription information using the information received from the serving AMF 406. For example, after receiving the information received from the serving AMF 406 in the tenth communication 436, the UDM/UDR 410 updates the status of the IE 'Configured NSSAI for HPLMN Provisioned'=from FALSE to TRUE. In addition, the UDM/UDR 410 may store the device ID (e.g., IMEI) for which the configured NSSAI has been provided.

To summarize some aspects relating to FIG. 4, there are several options for deriving and/or creating the configured NSSAI for the HPLMN: (1) it can be derived in the serving AMF 406 in the HPLMN; or (2) it can be derived and/or stored in the UDM/UDR 410 and sent to the serving AMF 406. For configured NSSAIs for other PLMNs (e.g., VPLMNs), the information may be created at the UDM/UDR 410 and sent to the serving AMF 406 to be provided to the UE 402. The UDM/UDR 410 keeps track of whether the UE 402 has been provided configured NSSAIs.

Figure 5:
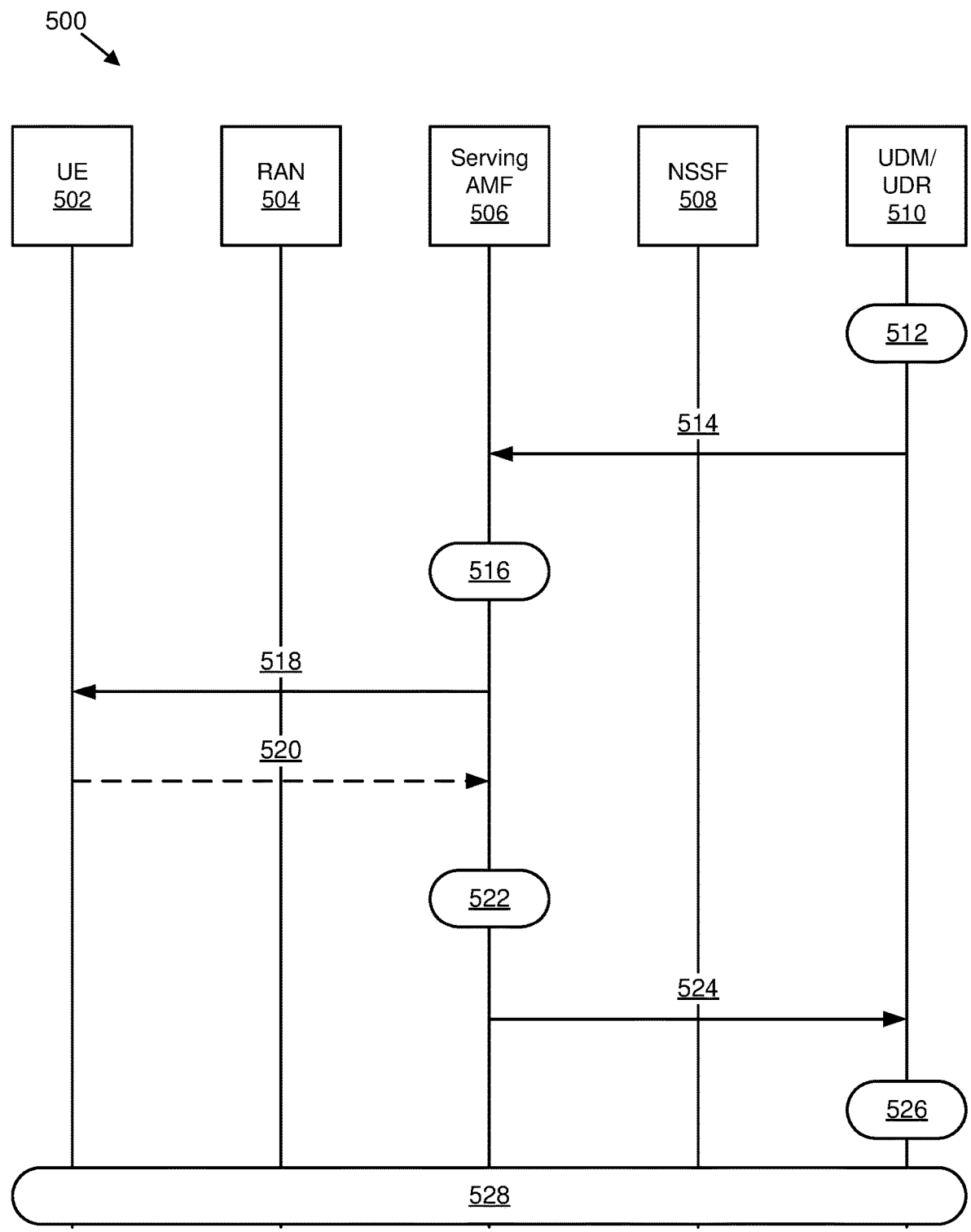
FIG. 5 is a schematic block diagram illustrating one embodiment of communications for a subscription information change in a UDM/UDR and UE network slicing configuration.

In one embodiment, a UE may be provided with an updated slice configuration (e.g., configured NSSAI for a serving VPLMN) if subscription information in a UDM/UDR changes, in particular if subscribed S-NSSAIs change. FIG. 5 shows this embodiment (e.g., changing subscribed S-NSSAIs in the UDM/UDR), updating an AMF, and updating the configuration (e.g., configured NSSAI for the HPLMN) in a UE.

In certain embodiments, such as in a roaming configuration, if there is a change to any subscribed S-NSSAIs for a UE that occurs in a UDM/UDR, then a serving vAMF and/or vNSSF may update the configured NSSAI for the VPLMN, but the serving vAMF may not be able to update the configured NSSAI for the HPLMN. In some embodiments, a UDM/UDR may send a configured NSSAI for a HPLMN as a transparent container to a vAMF and the vAMF may perform a UE configuration update procedure to update the 'Configured NSSAI for the HPLMN' for the UE together with the 'Configured NS SAI for the VPLMN'.

FIG. 5 is a schematic block diagram illustrating one embodiment of communications 500 for a subscription information change in a UDM/UDR and UE network slicing configuration. The communications 500 includes messages transmitted between a UE 502, a RAN 504, a serving AMF 506, an NSSF 508, and a UDM/UDR 510. As may be appreciated, each communication described herein may include one or more messages.

A UE's subscription information in the UDM/UDR 510 may change 512 at any time. For example, if the list of subscribed S-NSSAIs changes (e.g., adding or removing S-NSSAI values), then this may have an impact on the UE's configuration and also may impact the UE 502 current registration. The UDM/UDR 510 may trigger a subscription update procedure.

In a first communication 514 from the UDM/UDR 510 to the serving AMF 506, the UDM/UDR 510 may initiate a subscription information updated procedure transmitted to the serving AMF 506. For example, the UDM/UDR 510 may invoke a Nudm_SDM_Notification service provided to the serving AMF 506 subscribed for notifications. Depending on whether the UE 502 is registered in the HPLMN or in a VPLMN, the following may occur: 1) if the UE 502 is registered in the HPLMN (e.g., the serving AMF 506 is in the HPLMN), the UDM/UDR 510 includes in signaling to the serving AMF 506 at least one of the following: a SUPI; new subscribed S-NSSAIs; configured NSSAI for HPLMN indication; NSSP provisioned in the UE indication; a list of PLMN IDs; and/or MEI; 2) if the UE 502 is registered in a VPLMN (e.g., the Serving AMF 506 is in VPLMN, called vAMF), the UDM/UDR 510 includes in signaling to the serving AMF 506 at least one of the following: a SUPI; new subscribed S-NSSAIs; configured NSSAI for HPLMN; configured NSSAIs for other PLMNs; and/or IMEI. In some embodiments, information about the configured NSSAI for HPLMN and the configured NSSAIs for other PLMNs may be included in a container transparent to the vAMF containing a list of S-NSSAIs that may be provided to the UE 506 from the vAMF; however, the vAMF may not change the content of the transparent container.

The serving AMF 506 behaves 516 based on the first communication 514, depending whether the serving AMF 506 is a hAMF (e.g., in HPLMN) or vAMF (e.g., in VPLMN). If the serving AMF 506 is located in the VPLMN, the serving AMF 506, based on an updated subscribed S-NSSAIs and/or the new configured NSSAI for the HPLMN, may create and/or derive the configured NSSAI for the VPLMN and a corresponding mapping of configured NSSAI information. The serving AMF 506 either derives the configured NSSAI and mapping of configured NSSAI by itself or together with the NSSF.

In a second communication 518 from the serving AMF 506 to the UE 502, the serving AMF 506 initiates a UE configuration update procedure to configure the UE 502 with configured NSSAI for the HPLMN and other PLMNs. Specifically, the serving AMF 506 may send a UE configuration update command message. The UE configuration update command message for the UE network slicing configuration update may include: new configured NSSAI for the serving PLMN; a mapping of the configured NSSAI to the configured NSSAI for the HPLMN; and/or the new configured NSSAI for the HPLMN.

In a possible third communication 520 from the UE 502 to the serving AMF 506, the UE 502 may respond to the second communication 518 with a UE configuration update complete message to confirm the reception and successful network slicing configuration in the UE 502.

The serving AMF 506 may update 522 its information to indicate that the UE 502 has been provided the configured NSSAI.

In a fourth communication 524 from the serving AMF 506 to the UDM/UDR 510, the serving AMF 506 may initiate a procedure to perform a UE subscription information update to inform the UDM/UDR 510 that the UE 502 has been provided the configured NSSAI for the HPLMN. The serving AMF 506 may inform the UDM/UDR 510 about whether the whole list of subscribed S-NSSAIs has been provided to the UE 502, or whether only a single default S-NSSAI value has been provided to the UE 502. In addition, the serving AMF 506 may include a device ID and/or an equipment ID (e.g. IMEI), so that the UDM/UDR 510 knows and stores the device ID and/or the equipment ID to which the configured NSSAI has been provided. Accordingly, the device ID and/or the equipment ID may be used by the UDM/UDR 510 to determine whether a new device is used with the same subscription profile (e.g., with the same SIM card). The UDM/UDR 510 can either create a new entry for providing the configured NSSAI to a device having the device ID, or update an existing entry for the device ID.

The UDM/UDR 510 may update 526 the UE subscription information using the information received from the serving AMF 506.

After the configured NSSAI for the HPLMN or the configured NSSAI for the serving PLMN have been updated in the UE 502, in a fifth communication 528 between the UE 502, the RAN 504, the serving AMF 506, the NSSF 508, and/or the UDM/UDR 510, the UE 502 may initiate a registration procedure as per TS 23.502 to signal a new requested NSSAI based on the new configured NSSAI for the HPLMN or the configured NSSAI for the serving PLMN parameters.

In certain embodiments, a UE may be provided with a slice configuration (e.g., configured NSSAI for serving VPLMN) in roaming configurations.

Figure 6:
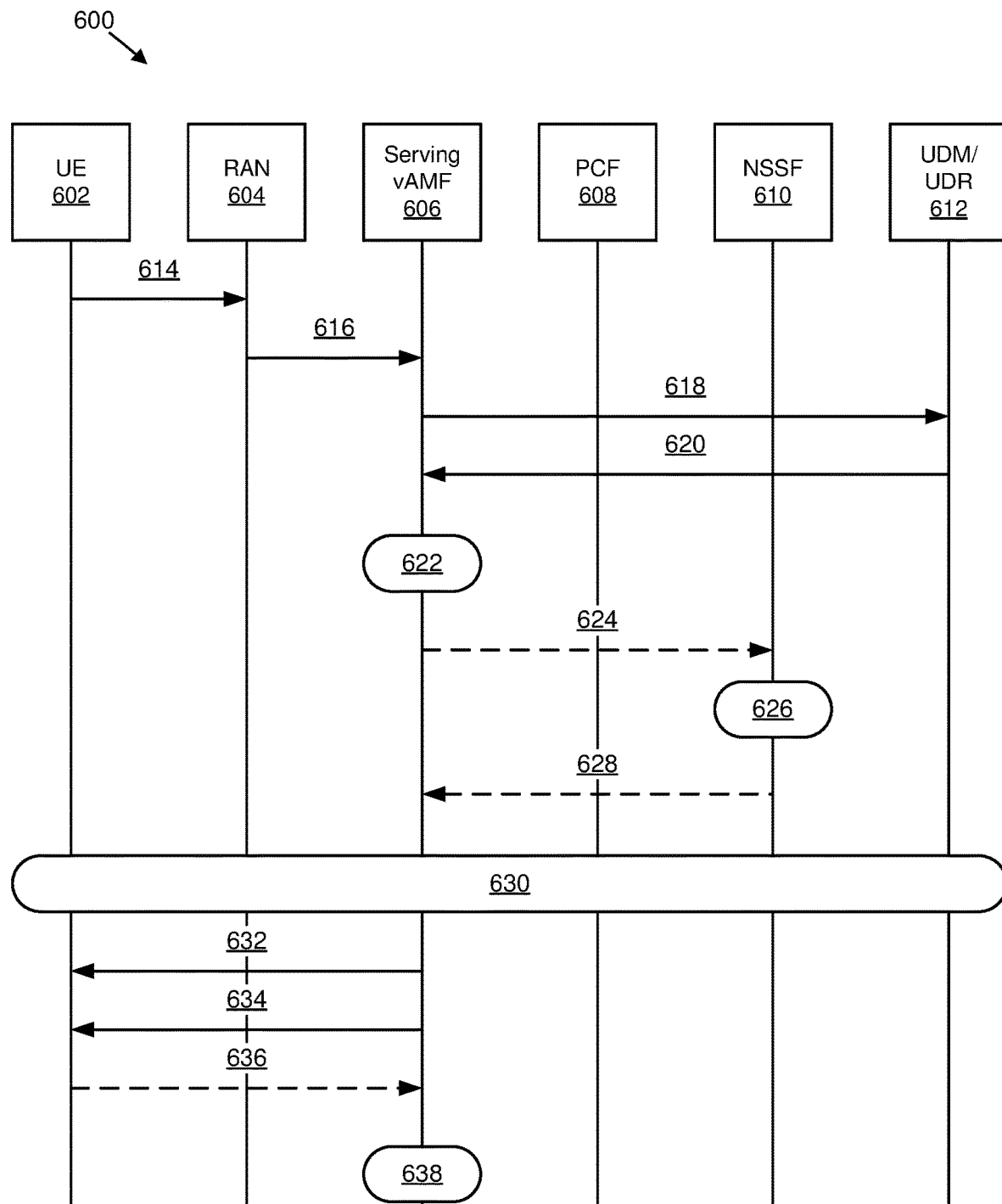
FIG. 6 is a schematic block diagram illustrating one embodiment of communications for signaling flow to provision a UE with a slice configuration in a roaming configuration.

FIG. 6 is a schematic block diagram illustrating one embodiment of communications 600 for signaling flow to provision a UE with a slice configuration in a roaming configuration. The communications 600 includes messages transmitted between a UE 602, a RAN 604, a serving vAMF 606, a PCF 608, an NSSF 610, and a UDM/UDR 612. As may be appreciated, each communication described herein may include one or more messages.

In a first communication 614 transmitted from the UE 602 to the RAN 604, the UE 602 may send a NAS registration request message to the RAN 604 that may include: a UE ID (e.g., SUPI); a registration type (e.g., initial, mobility), and/or a requested NSSAI. The NAS registration request message may be encapsulated in RRC signaling. In some embodiments, the RRC signaling contains a requested NSSAI. It some embodiments, the requested NSSAI is not included or is equal to zero.

In a second communication 616 transmitted from the RAN 604 to the serving vAMF 606, the RAN 604 may send the NAS registration request message to the serving vAMF 606.

In a third communication 618 transmitted from the serving vAMF 606 to the UDM/UDR 612, the serving vAMF 606 may request the UE subscription information from the UDM/UDR 612 via a UE subscription request. For example, the serving vAMF 606 may register with the UDM/UDR 612 using a Nudm_UECM_Registration service.

In a fourth communication 620 transmitted from the UDM/UDR 612 to the serving vAMF 606, the serving vAMF 606 may retrieve access and mobility subscription data and SMF selection subscription data using a service Nudm_SDM_Get, for example. In some embodiments, the UDM/UDR 612 includes in the fourth communication 620 an indication about whether the configured NSSAI for HPLMN has been provided to the UE 602. For example, this indication may be indicated by an IE having different values (e.g., 'Configured NSSAI for HPLMN Provisioned'=TRUE (or FALSE)).

In certain embodiments, the configured NSSAI for the HPLMN may be sent from the UDM/UDR 612 to the serving vAMF 606. If the configured NSSAI for the HPLMN is included in the UE's subscription information from the UDM/UDR 612, the configured NSSAI can be used as an indication to the serving vAMF 606 that the configured NSSAI for the HPLMN has been provided to the UE 602. If the configured NSSAI for the HPLMN is not included in the UE's subscription information from the UDM/UDR 612, the lack of the configured NSSAI may be used as indication to the serving vAMF 606 that the configured NSSAI for the HPLMN has not been provided to the UE 602.

If the NAS registration request message does not contain requested NSSAI, and the registration type is "Initial Registration," "Mobility Registration Update," or the like, the serving vAMF 606 determines 622 that the UE 602 has not been provided with a configured NSSAI for a current PLMN. The serving vAMF 606 may decide to provide the UE 602 with the configured NS SAI and/or send a corresponding request message to the NSSF 610.

It should be noted that the serving vAMF 606, in determining whether to provide the UE 602 with the configured NSSAI, may take into account one of the following conditions: 1) whether the UE 602 has been provided with a configured NSSAI for a HPLMN. For example, if the configured NSSAI for HPLMN=TRUE, the serving vAMF 606 may decide to provide the UE with a configured NSSAI for a serving PLMN. One reason for the AMF to consider this indication is as follows: if the "Configured NSSAI for the HPLMN" is not provided to the UE 602, then providing the configured NSSAI for a current VPLMN may not make sense if there are VPLMN-specific S-NSSAI values that may map to S-NSSAI values from the HPLMN. In other words, mapping information for the configured NSSAI (e.g., 'Mapping Of Configured NSSAI') and mapping information for allowed NSSAI (e.g., 'Mapping Of Allowed NSSAI') may not be provided to the UE 602. However, if the mapping information is not needed, then the serving vAMF 606 and/or a vNSSF may derive and provide the UE 602 with a configured NSSAI for a current PLMN (and allowed NSSAI); and/or 2) whether there is a single subscribed S-NSSAI. If there is a single subscribed S-NSSAI, the serving vAMF 606 may omit providing the Configured NSSAI for the current PLMN.

In some embodiments, the serving vAMF 606, based on local policies and/or configuration, may derive the configured NSSAI and the corresponding 'Mapping Of Configured NSSAI' information by itself In such embodiments, communications 624 through 628 may be omitted.

In a potential fifth communication 624 transmitted from the serving vAMF 606 to the NSSF 610, the serving vAMF 606 sends to the NSSF 610 a slice selection request (e.g., subscribed S-NSSAIs, a TAI, a PLMN ID of a SUPI, a request for allowed NSSAI, and/or a request for configured NSSAI). If the serving vAMF 606 has decided to provide the UE 602 with a configured NSSAI for a serving PLMN, and the serving vAMF 606 (e.g., based on local policies or configuration) is not able to derive and/or create the configured NSSAI for the current PLMN, the serving vAMF 606 may send an indication to the NSSF 610 to request the NSSF 610 to create and/or derive a configured NSSAI for the UE 602 for the current PLMN. In some embodiments, the indication may be called a 'Request for Configured NSSAI' or the like.

In certain embodiments, the serving vAMF 606 may be able or may not be able to create allowed NSSAI for the UE 602 for a registration area. If the serving vAMF 606, based on local policies and/or configuration in the serving vAMF 606, is not able to create allowed NSSAI for the UE 602, the serving vAMF 606 sends an indication to the NSSF 610 to request the NSSF 610 to create and/or derive an allowed NSSAI for the UE 602 for a current PLMN. In various embodiments, the indication can be called a 'Request for Allowed NSSAI' or the like.

In some embodiments, the NSSF 610 (e.g. serving NSSF, vising NSSF) may derive 626 information requested by the serving vAMF 606 in the fifth communication 624. Based on subscribed S-NSSAIs and SUPI's PLMN ID received from the serving vAMF 606, the NSSF 610 is able to determine the configured NSSAI together with 'Mapping Of Configured NSSAI' and also allowed NSSAI with 'Mapping Of Allowed NSSAI' for the UE 602. The NSSF 610 may take into account the SLA agreements with the HPLMN in order to derive the 'Mapping Of Configured NSSAI' information and the 'Mapping Of Allowed NSSAI' information.

If needed, the NSSF in the VPLMN (e.g., vNSSF) may request information from the NSSF in the HPLMN (e.g., hNSSF) to derive the configured NSSAI together with mapping of configured NSSAI and allowed NSSAI with mapping of allowed NSSAI information. The vNSSF and the hNSSF exchange signaling over an N31 interface. In order to provide complete information to the vNSSF, the hNSSF may retrieve UE subscription information (e.g., subscribed S-NSSAIs) from the UDM/UDR 612. The reason for the hNSSF to retrieve subscription information may be that the subscribed S-NSSAIs signaled from the serving vAMF 606 to vNSSF and further from vNSSF to hNSSF may not be the complete list of subscribed S-NSSAIs as stored in the UDM/UDR 612. It should be noted that the information exchange between the NSSF (e.g. hNSSF) and UDM/UDR 612 may use enhancements to the functionality of the NSSF and of the UDM/UDR 612.

In a potential sixth communication 628 transmitted from the NS SF 610 to the serving vAMF 606, the NSSF 610 sends to the serving vAMF 606 a slice selection response (e.g., a target AMF, a set or list of AMF addresses, allowed NSSAI, a mapping of allowed NS SAI, NSI IDs, NRF(s), a list of rejected S-NSSAIs, cause values of rejected S-NSSAIs, configured NSSAI, and/or a mapping of configured NSSAI).

The NSSF 610 may create the information transmitted in the sixth communication 628 about the allowed NSSAI, mapping of allowed NSSAI, configured NSSAI, and/or mapping of configured NSSAI as described herein.

In a seventh communication 630 between the UE 602, the RAN 604, the serving vAMF 606, the PCF 608, the NSSF 610, and/or the UDM/UDR, messages may be sent based on the registration procedure as described in TS 23.502.

In an eighth communication 632 from the serving vAMF 606 to the UE 602, the serving vAMF 606 may transmit a registration accept message to the UE 602.

In a ninth communication 634 from the serving vAMF 606 to the UE 602, the serving vAMF 606 may initiate a UE configuration update procedure in order to update the UE network slicing configuration. The serving vAMF 606 may provide the UE 602 with a new configured NSSAI for a serving PLMN which may be associated with mapping of the S-NSSAIs values from the configured NSSAI to the S-NSSAI values from the configured NSSAI for the HPLMN. The UE network slicing configuration may contain: 'Configured NS SAI' for the serving PLMN information and/or 'Mapping Of Configured NSSAI' information.

In a potential tenth communication 636 from the UE 602 to the serving vAMF 606, the UE 602 may send a UE configuration update complete message to the serving vAMF 606 if the UE configuration update indication requires acknowledgement of the UE configuration update command.

The serving vAMF 606 may update 638 a UE MM context and may store the network slicing configuration information (e.g., received from the NSSF 610), in particular the 'Configured NSSAI' and 'Mapping Of Configured NSSAI' information. The UE MM context may be transferred to any other AMF (or MME) during mobility procedures (IDLE mode or CONNECTED mode mobility).

In various embodiments, the serving vAMF 606 first determines whether to provide (or update) the UE 602 with configured NSSAI. If providing (or updating) is needed, then the configured NSSAI for a serving PLMN (e.g., VPLMN) is created either: (a) in the serving vAMF 606 or (b) in the NSSF 610 (e.g., vNSSF) if the serving vAMF 606 is not able to create it based on local policies (the serving vAMF 606 may explicitly request the NSSF 610 to derive the configured NSSAI and/or the allowed NSSAI).

In certain embodiments, if the serving vAMF 606 (alone or together with the NSSF 610) derives a configured NSSAI and/or the VPLMN maps configured NSSAI information, the serving vAMF 606 may send this derived network slicing configuration information to the UDM/UDR 612 for storing and for possible exposure to other NFs (e.g., other AMFs). Such network slicing configuration information (e.g., configured NSSAIs) may be stored in the UDM/UDR 612 and exposed to other NFs if requested.

In some embodiments, in a non-roaming configuration, an AMF may create a configured NSSAI for a HPLMN and provide the configured NSSAI to a UE. Based on the subscription information, the AMF may indicate to the UE to which PLMN IDs the configured NSSAI for the HPLMN may apply. A UDM/UDR may provide the AMF additional configured NSSAIs for other PLMNs which may be provided to the UE as part of network slicing configuration information.

In various embodiments, in a roaming configuration, an AMF may request an NSSF to create configured NSSAI for a serving PLMN associated with mapping of the configured NSSAI to configured NSSAI for the HPLMN. A UDM/UDR may send the configured NSSAI for the HPLMN to a serving AMF and the serving AMF may include this information if exchanging information with the NSSF (e.g., visited NSSF). The NSSF may use the configured NSSAI for the HPLMN also for creating a mapping of allowed NSSAI to corresponding S-NSSAI values in the configured NSSAI for the HPLMN.

In certain embodiments, an AMF may determine to trigger providing or updating a UE with a new configured NSSAI for a serving PLMN in the following cases:

1) if a requested NSSAI is not included in a registration request message and subscribed S-NSSAIs contain at least one value which is not used in the serving PLMN (e.g., PLMN-specific non-standard S-NSSAI value); or if the requested NSSAI is included in the registration request message, but one or more of the S-NSSAI values are not known to the AMF, the AMF may request the NSSF for resolution of the unknown values and the AMF (together with NSSF) may determine that the configured NSSAI for the serving PLMN is not correct and needs to be updated; and 2) if there is an indication from a UDM about a change of subscribed S-NSSAIs or an indication with a new configured NSSAI for the HPLMN; or if the network slice availability has changed in the serving PLMN as specified in clause 5.15.8, the NSSF may notify the AMF about the slice availability change and/or the NSSF may indicate a new configured NSSAI (and possibly allowed NSSAI) together with corresponding mapping information to the configured NSSAI for the HPLMN.

In some embodiments, configured NS SAI may be provided by a PCF infrastructure. In such embodiments, if a UE sends a registration request message to an AMF, the AMF interfaces with the PCF to obtain a configured NSSAI for the UE. Moreover, the AMF explicitly requests the configured NSSAI for this PLMN and the PCF includes an additional policy within the UE policy content that may contain slice selection policies in a PLMN.

Figure 7:
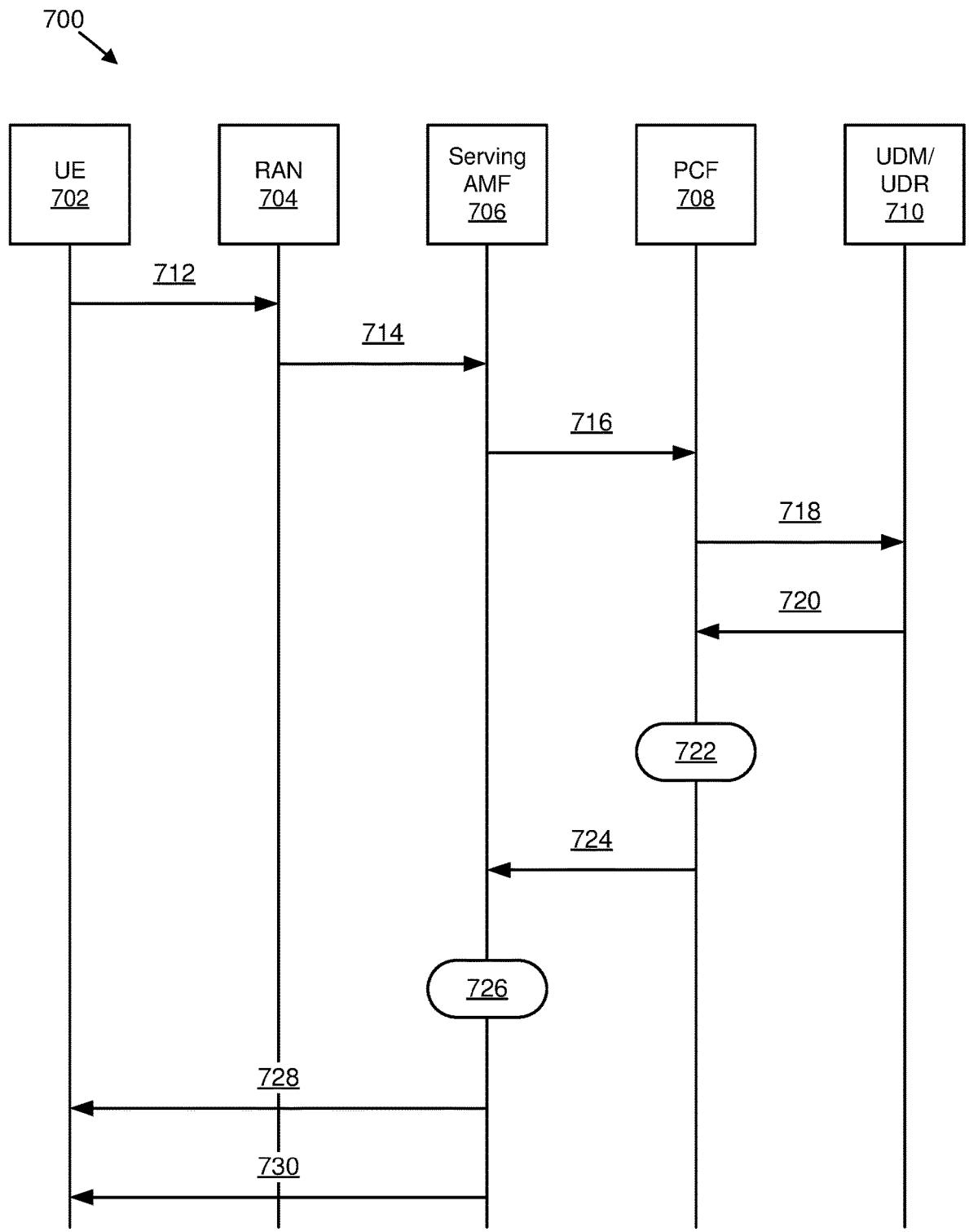
FIG. 7 is a schematic block diagram illustrating one embodiment of communications for signaling flow to provision a UE with a slice configuration via a PCF.

FIG. 7 is a schematic block diagram illustrating one embodiment of communications 700 for signaling flow to provision a UE with a slice configuration via a PCF. The communications 700 includes messages transmitted between a UE 702, a RAN 704, a serving AMF 706, a PCF 708, and a UDM/UDR 710. As may be appreciated, each communication described herein may include one or more messages.

In a first communication 712 transmitted from the UE 702 to the RAN 704, the UE 702 may send a NAS registration request message to the RAN 704 that may include: a UE ID (e.g., SUPI); a registration type (e.g., initial, mobility), and/or a requested NSSAI. The NAS registration request message may be encapsulated in RRC signaling. In some embodiments, the RRC signaling contains a requested NSSAI. It some embodiments, the requested NSSAI is not included or is equal to zero.

In a second communication 714 transmitted from the RAN 704 to the serving AMF 706, the RAN 704 may send the NAS registration request message to the serving AMF 706.

In a third communication 716 transmitted from the serving AMF 706 to the PCF 708, the serving AMF 706 requests new UE policies from the PCF 708. The serving AMF 706 includes in the request that the UE 702 has no configured NSSAI. If the UE 702 is roaming, the serving AMF 706 sends the request to a V-PCF (e.g., visited PCF). The V-PCF forwards the request to the H-PCF (e.g., home PCF). The serving AMF 706 may explicitly request the configured NSSAI for a current PLMN from the PCF 708.

In a fourth communication 718 transmitted from the PCF 708 to the UDM/UDR 710, the PCF 708 (e.g., H-PCF) requests from the UDM/UDR 710 subscribed NSSAI. If the UE 702 is roaming the PCF 708 includes a serving PLMN ID in the request.

In a fifth communication 720 transmitted from the UDM/UDR 710 to the PCF 708, the UDM/UDR 710 provides subscription information including the subscribed NSSAI. The UDM/UDR 710 may also provide a list of configured NSSAI for each PLMN the operator has SLAs with and a configured NSSAI of the HPLMN.

The PCF 708 adds 722 the configured NSSAI of the HPLMN and the configured NSSAI list per PLMN within the PLMN slice selection policy included within the UE policy. The PCF 708 may also interact with an NSSF to generate this information. For example, the PCF 708 may request the NSSF to derive mapping information of the configured NSSAI for the VPLMN to the configured NSSAI for the HPLMN.

In a sixth communication 724 transmitted from the PCF 708 to the serving AMF 706, the PCF 708 provides the UE policy to the serving AMF 706. If the UE 702 is roaming, the PCF 708 provides the UE policy to the V-PCF. The PCF 708 also includes the subscribed NSSAI provided by the UDM/UDR 710. The V-PCF may add its own PLMN slice selection policy (e.g., configured NSSAI). The V-PCF uses the subscribed NSSAI provided by the HPLMN to determine the configured NSSAI.

The serving AMF 706 determines 726 whether a UE policy should be sent to the UE 702 and uses a configuration update procedure once registration is complete.

In a seventh communication 728 transmitted from the serving AMF 706 to the UE 702, the serving AMF 706 sends a registration accept including the allowed NSSAI.

In an eighth communication 730 transmitted from the serving AMF 706 to the UE 702, the serving AMF 706 sends a UE configuration update procedure including the updated UE policy.

In certain embodiments, a PLMN slice selection policy may include the following information: a list of PLMN slice selection policies in priority order. Moreover, each policy may include the following information: a PLMN ID, a configured NSSAI, and/or a mapping of configured NSSAI to HPLMN configured NSSAI.

In some embodiments, if the UE 702 sends a registration request and contains a PLMN slice selection policy, the UE 702 checks the PLMN ID and selects a highest priority policy of that PLMN. The UE 702 includes in the registration request only the NSSAIs within the configured NSSAI.

Figure 8:
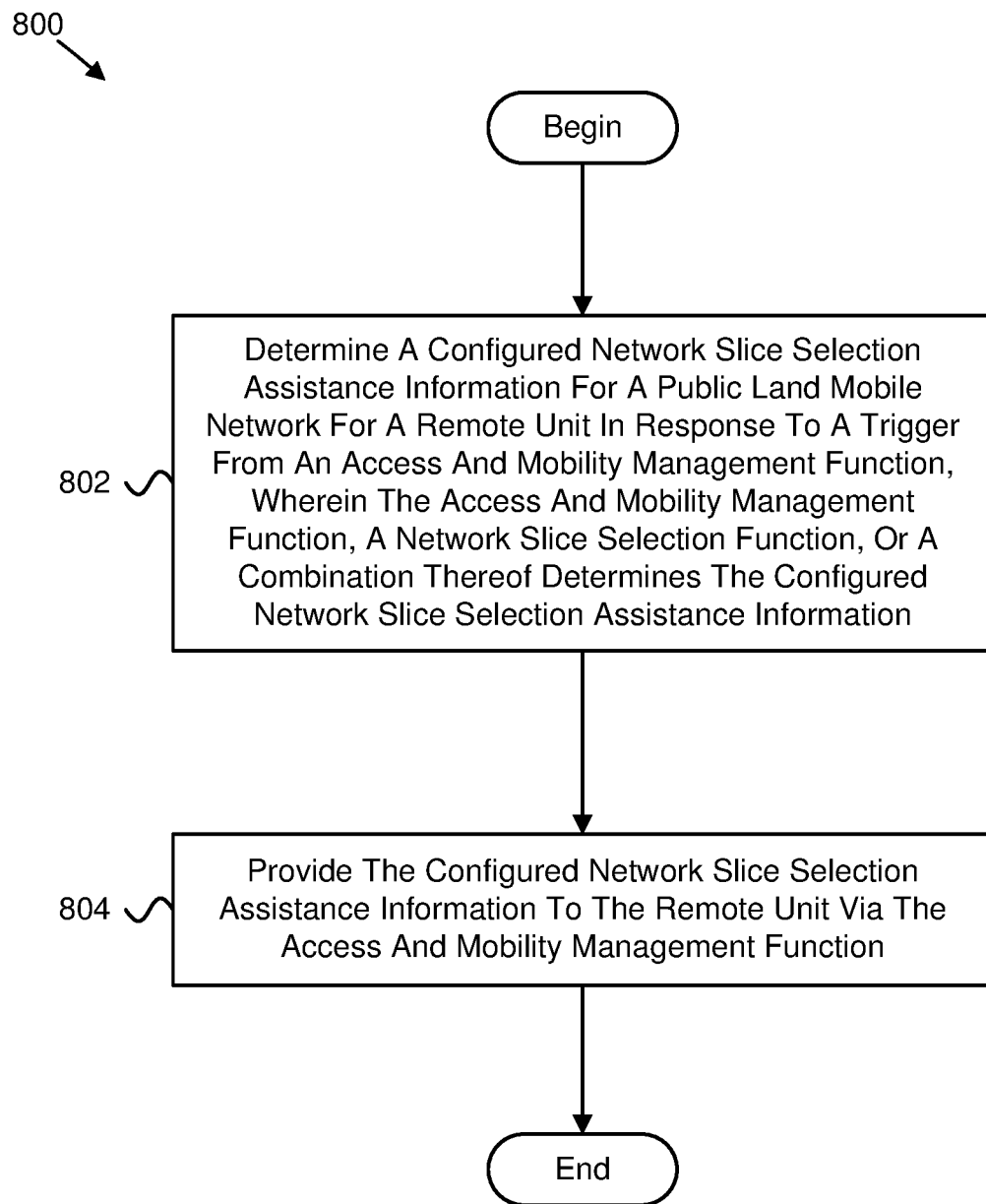
FIG. 8 is a flow chart diagram illustrating one embodiment of a method for NSSAI configuration.

FIG. 8 is a flow chart diagram illustrating one embodiment of a method 800 for NSSAI configuration. In some embodiments, the method 800 is performed by an apparatus, such as the network unit 104. In certain embodiments, the method 800 may be performed by a processor executing program code, for example, a microcontroller, a microprocessor, a CPU, a GPU, an auxiliary processing unit, a FPGA, or the like.

The method 800 may include determining 802 a configured network slice selection assistance information for a public land mobile network for a remote unit 102 in response to a trigger from an access and mobility management function. In such an embodiment, the access and mobility management function, a network slice selection function, or a combination thereof determines the configured network slice selection assistance information. In certain embodiments, the method 800 includes providing 804 the configured network slice selection assistance information to the remote unit 102 via the access and mobility management function.

In certain embodiments, the access and mobility management function determines the configured network slice selection assistance information. In some embodiments, the access and mobility management function determines the configured network slice selection assistance information in response to not receiving information about network slice selection assistance information in a registration request. In various embodiments, the access and mobility management function determines the configured network slice selection assistance information in response to determining that the remote unit 102 should be provided the configured network slice selection assistance information.

In one embodiment, the access and mobility management function determines the configured network slice selection assistance information based on an indication from a subscription repository about updated network slice subscription data related to the remote unit 102. In certain embodiments, the network slice selection function determines the configured network slice selection assistance information. In some embodiments, the network slice selection function determines the configured network slice selection assistance information in response to a request from the access and mobility management function not including a requested network slice selection assistance information.

In various embodiments, the method 800 further comprises receiving an indication that subscribed network slice selection assistance information has changed, wherein the configured network slice selection assistance information is provided to the remote unit 102 in response to the change in the subscribed network slice selection assistance information. In one embodiment, the indication is received from a unified data management function. In certain embodiments, the unified data management function tracks whether the subscribed network slice selection assistance information has resulted in updating of the configured network slice selection assistance information in the remote unit.

In some embodiments, the method 800 further comprises receiving an indication from a unified data management function that the configured network slice selection assistance information is no longer valid. In various embodiments, the method 800 further comprises receiving an acknowledgement from the remote unit 102 indicating that the configured network slice selection assistance information is updated at the remote unit 102. In one embodiment, the method 800 further comprises transmitting information to a unified data management function indicating that the configured network slice selection assistance information is updated at the remote unit 102.

Figure 9:
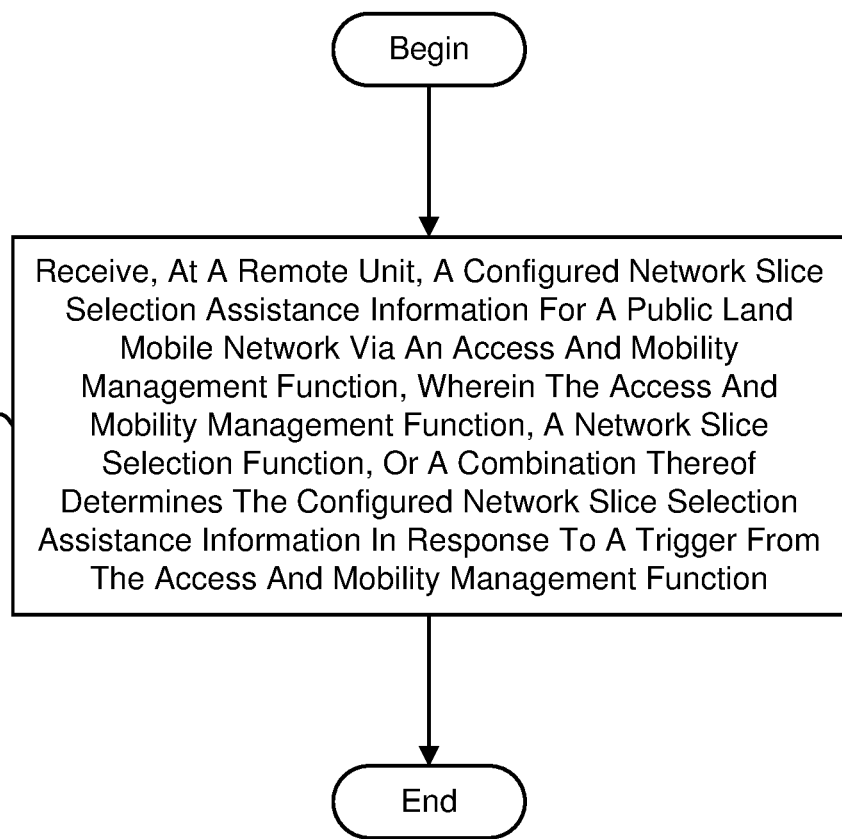
FIG. 9 is a flow chart diagram illustrating another embodiment of a method for NSSAI configuration.

FIG. 9 is a flow chart diagram illustrating another embodiment of a method 900 for NSSAI configuration. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902, at a remote unit 102, a configured network slice selection assistance information for a public land mobile network via an access and mobility management function. In such an embodiment, the access and mobility management function, a network slice selection function, or a combination thereof determines the configured network slice selection assistance information in response to a trigger from the access and mobility management function.

In certain embodiments, the access and mobility management function determines the configured network slice selection assistance information. In some embodiments, the access and mobility management function determines the configured network slice selection assistance information in response to not receiving information about network slice selection assistance information in a registration request. In various embodiments, the access and mobility management function determines the configured network slice selection assistance information in response to determining that the remote unit 102 should be provided the configured network slice selection assistance information.

In one embodiment, the access and mobility management function determines the configured network slice selection assistance information based on an indication from a subscription repository about updated network slice subscription data related to the remote unit 102. In certain embodiments, the network slice selection function determines the configured network slice selection assistance information. In some embodiments, the network slice selection function determines the configured network slice selection assistance information in response to a request from the access and mobility management function not including a requested network slice selection assistance information.

In various embodiments, the method 900 further comprises transmitting an acknowledgement from the remote unit 102 indicating that the configured network slice selection assistance information is updated at the remote unit 102.

Figure 10:
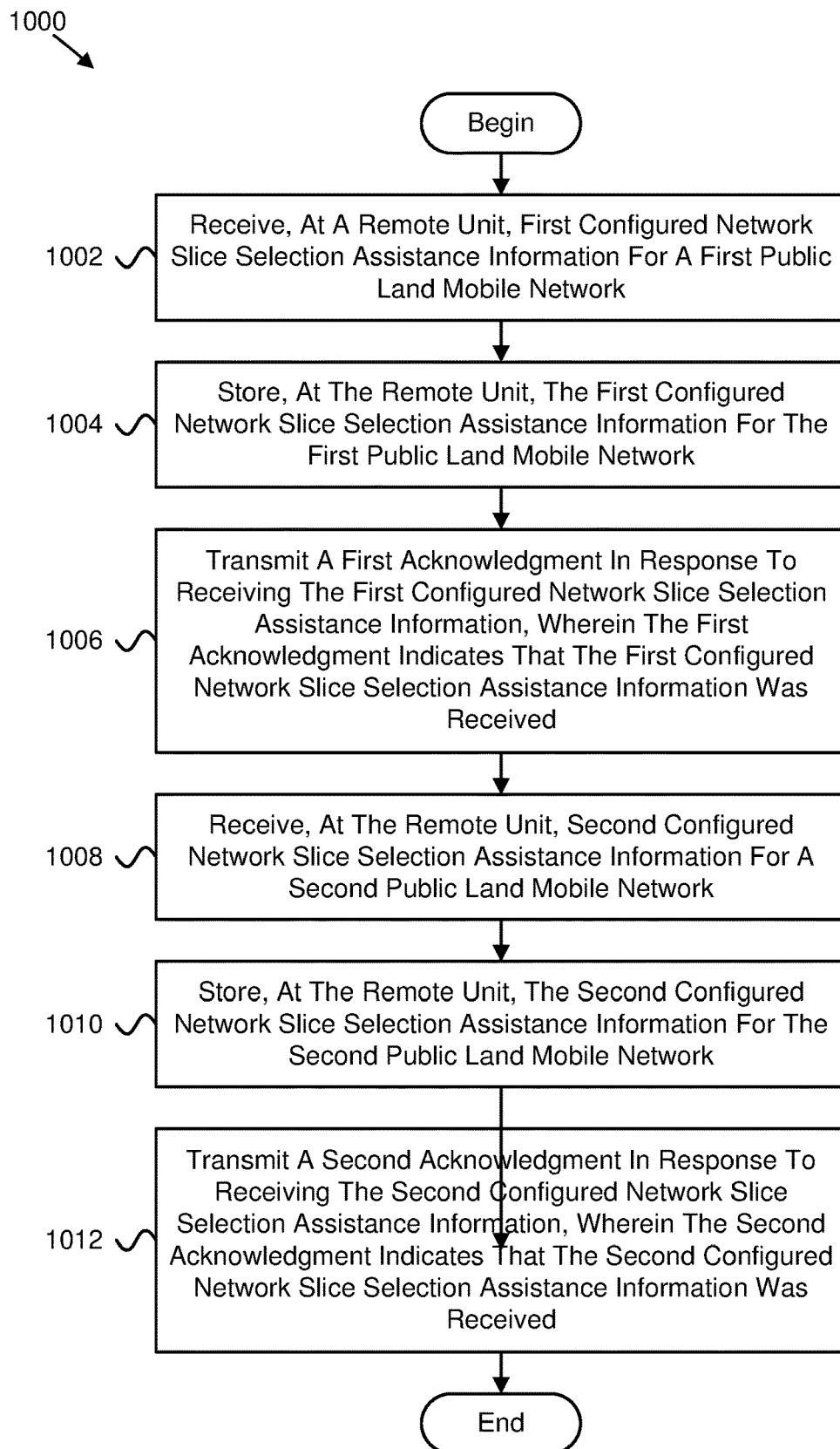
FIG. 10 is a flow chart diagram illustrating a further embodiment of a method for NSSAI configuration.

FIG. 10 is a flow chart diagram illustrating a further embodiment of a method 1000 for NSSAI configuration. In some embodiments, the method 1000 is performed by an apparatus, such as the remote unit 102. In certain embodiments, the method 1000 may be performed by a processor executing program code, for example, a microcontroller, a microprocessor, a CPU, a GPU, an auxiliary processing unit, a FPGA, or the like.

The method 1000 may include receiving 1002, at a remote unit 102, first configured network slice selection assistance information for a first public land mobile network. In some embodiments, the method 1000 includes storing 1004, at the remote unit 102, the first configured network slice selection assistance information for the first public land mobile network. In certain embodiments, the method 1000 includes transmitting 1006 a first acknowledgment in response to receiving the first configured network slice selection assistance information. In such embodiments, the first acknowledgment indicates that the first configured network slice selection assistance information was received. In various embodiments, the method 1000 includes receiving 1008, at the remote unit 102, second configured network slice selection assistance information for a second public land mobile network. In one embodiment, the method 1000 includes storing 1010, at the remote unit 102, the second configured network slice selection assistance information for the second public land mobile network. In some embodiments, the method 1000 includes transmitting 1012 a second acknowledgment in response to receiving the second configured network slice selection assistance information. In such embodiments, the second acknowledgment indicates that the second configured network slice selection assistance information was received.

Figure 11:
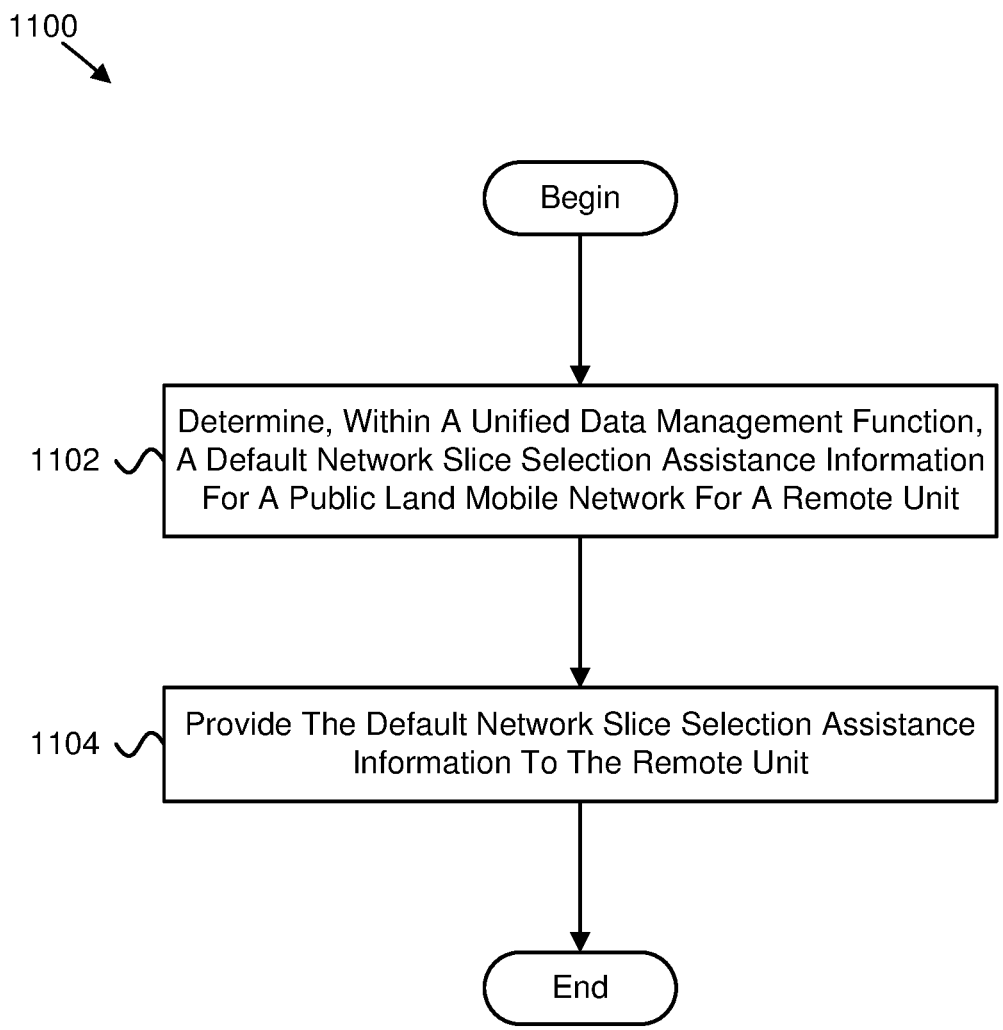
FIG. 11 is a flow chart diagram illustrating yet another embodiment of a method for NSSAI configuration.

FIG. 11 is a flow chart diagram illustrating yet another embodiment of a method 1100 for NSSAI configuration. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

The method 1100 may include determining 1102, within a unified data management, function a default network slice selection assistance information for a public land mobile network for a remote unit 102. As used herein, a default network slice selection assistance information for a public land mobile network may be a default network slice selection assistance information for any public land mobile network. For example, a default network slice selection assistance information for a public land mobile network may be a default network slice selection assistance information for all public land mobile networks (e.g., there is no specific network slice selection assistance information for a particular public land mobile network). In some embodiments, the method 1100 includes providing 1104 the default network slice selection assistance information to the remote unit 102.

In certain embodiments, the method 1100 further comprises receiving an acknowledgment indicating that the remote unit 102 is updated with the default network slice selection assistance information. In some embodiments, the method 1100 further comprises receiving information indicating a subscription change. In various embodiments, the method 1100 further comprises updating the default network slice selection assistance information in response to receiving the information indicating the subscription change.

In one embodiment, the method 1100 further comprises providing the updated default network slice selection assistance information to the remote unit 102. In certain embodiments, providing the default network slice selection assistance information to the remote unit 102 comprises providing the default network slice selection assistance information to the remote unit 102 via an access and mobility management function. In some embodiments, the default network slice selection assistance information is included in a non-access stratum signaling message sent from an access and mobility management function. In various embodiments, in response to providing the default network slice selection assistance information, stored default network slice selection assistance information is updated by the remote unit 102.

In one embodiment, determining the default network slice selection assistance information for a public land mobile network for the remote unit 102 comprises determining the default network slice selection assistance information for public land mobile networks (e.g., any public land mobile networks) for which no specific (e.g., no other) configured network slice selection assistance information has been provided to the remote unit 102.

Figure 12:
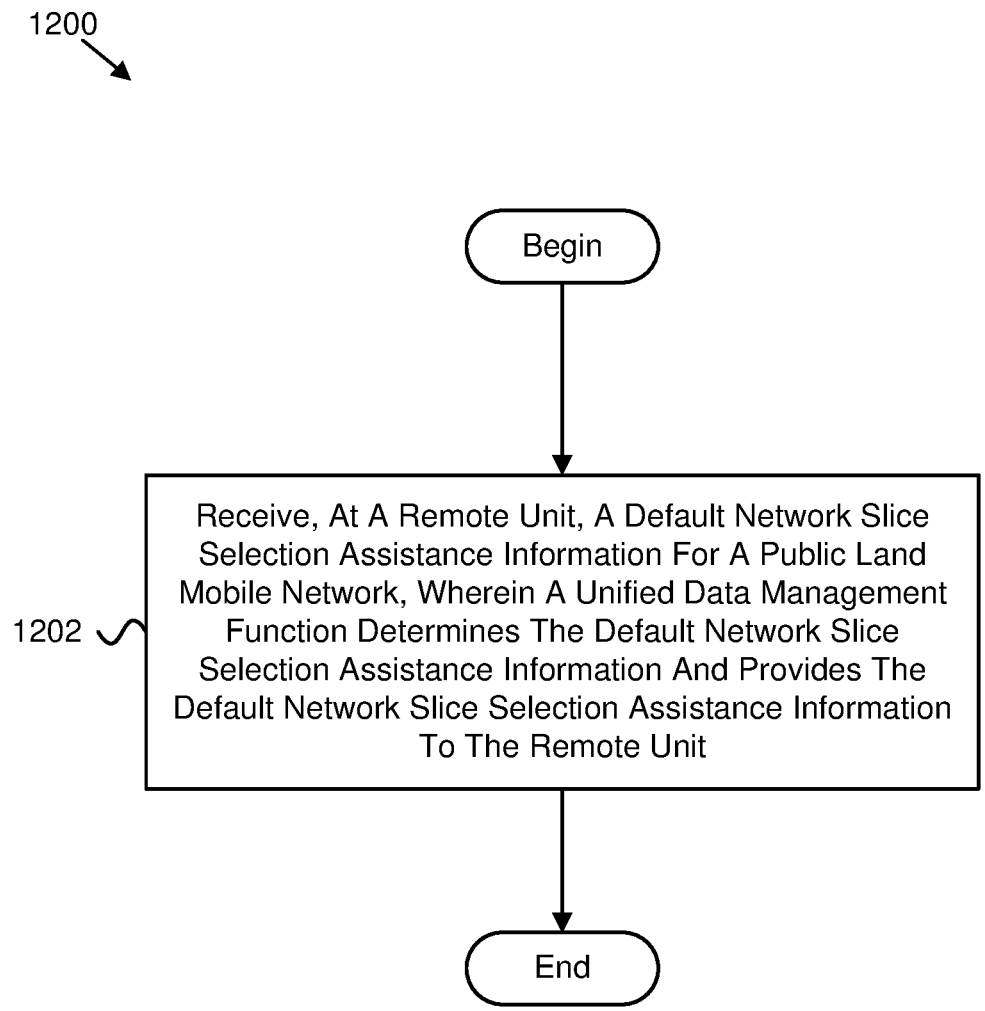
FIG. 12 is a flow chart diagram illustrating a yet further embodiment of a method for NSSAI configuration.

FIG. 12 is a flow chart diagram illustrating a yet further embodiment of a method 1200 for NSSAI configuration. In some embodiments, the method 1200 is performed by an apparatus, such as the remote unit 102. In certain embodiments, the method 1200 may be performed by a processor executing program code, for example, a microcontroller, a microprocessor, a CPU, a GPU, an auxiliary processing unit, a FPGA, or the like.

The method 1200 may include receiving 1202, at a remote unit 102, a default network slice selection assistance information for a public land mobile network. In such an embodiment, a unified data management function determines the default network slice selection assistance information and provides the default network slice selection assistance information to the remote unit 102.

In certain embodiments, the method 1200 further comprises transmitting an acknowledgment indicating that the remote unit 102 is updated with the default network slice selection assistance information. In some embodiments, the unified data management function provides the default network slice selection assistance information to the remote unit 102 via an access and mobility management function. In various embodiments, the default network slice selection assistance information is included in a non-access stratum signaling message sent from an access and mobility management function. In one embodiment, the method 1200 further comprises, in response to receiving the default network slice selection assistance information, updating stored default network slice selection assistance information of the remote unit 102.

In certain embodiments, the unified data management function determines the default network slice selection assistance information by determining the default network slice selection assistance information for public land mobile networks (e.g., any public land mobile networks) for which no specific (e.g., no other) configured network slice selection assistance information has been provided to the remote unit 102.

In one embodiment, a method comprises: determining a configured network slice selection assistance information for a public land mobile network for a remote unit in response to a trigger from an access and mobility management function, wherein the access and mobility management function, a network slice selection function, or a combination thereof determines the configured network slice selection assistance information; and providing the configured network slice selection assistance information to the remote unit via the access and mobility management function.

In certain embodiments, the access and mobility management function determines the configured network slice selection assistance information.

In some embodiments, the access and mobility management function determines the configured network slice selection assistance information in response to not receiving information about network slice selection assistance information in a registration request.

In various embodiments, the access and mobility management function determines the configured network slice selection assistance information in response to determining that the remote unit should be provided the configured network slice selection assistance information.

In one embodiment, the access and mobility management function determines the configured network slice selection assistance information based on an indication from a subscription repository about updated network slice subscription data related to the remote unit.

In certain embodiments, the network slice selection function determines the configured network slice selection assistance information.

In some embodiments, the network slice selection function determines the configured network slice selection assistance information in response to a request from the access and mobility management function not including a requested network slice selection assistance information.

In various embodiments, the method further comprises receiving an indication that subscribed network slice selection assistance information has changed, wherein the configured network slice selection assistance information is provided to the remote unit in response to the change in the subscribed network slice selection assistance information.

In one embodiment, the indication is received from a unified data management function.

In certain embodiments, the unified data management function tracks whether the subscribed network slice selection assistance information has resulted in updating of the configured network slice selection assistance information in the remote unit.

In some embodiments, the method further comprises receiving an indication from a unified data management function that the configured network slice selection assistance information is no longer valid.

In various embodiments, the method further comprises receiving an acknowledgement from the remote unit indicating that the configured network slice selection assistance information is updated at the remote unit.

In one embodiment, the method further comprises transmitting information to a unified data management function indicating that the configured network slice selection assistance information is updated at the remote unit.

In one embodiment, an apparatus comprises: a processor that determines a configured network slice selection assistance information for a public land mobile network for a remote unit in response to a trigger from an access and mobility management function, wherein the access and mobility management function, a network slice selection function, or a combination thereof determines the configured network slice selection assistance information; and a transmitter that provides the configured network slice selection assistance information to the remote unit via the access and mobility management function.

In certain embodiments, the access and mobility management function determines the configured network slice selection assistance information.

In some embodiments, the access and mobility management function determines the configured network slice selection assistance information in response to not receiving information about network slice selection assistance information in a registration request.

In various embodiments, the access and mobility management function determines the configured network slice selection assistance information in response to determining that the remote unit should be provided the configured network slice selection assistance information.

In one embodiment, the access and mobility management function determines the configured network slice selection assistance information based on an indication from a subscription repository about updated network slice subscription data related to the remote unit.

In certain embodiments, the network slice selection function determines the configured network slice selection assistance information.

In some embodiments, the network slice selection function determines the configured network slice selection assistance information in response to a request from the access and mobility management function not including a requested network slice selection assistance information.

In various embodiments, the apparatus further comprises a receiver that receives an indication that subscribed network slice selection assistance information has changed, wherein the configured network slice selection assistance information is provided to the remote unit in response to the change in the subscribed network slice selection assistance information.

In one embodiment, the indication is received from a unified data management function.

In certain embodiments, the unified data management function tracks whether the subscribed network slice selection assistance information has resulted in updating of the configured network slice selection assistance information in the remote unit.

In some embodiments, the apparatus further comprises a receiver that receives an indication from a unified data management function that the configured network slice selection assistance information is no longer valid.

In various embodiments, the apparatus further comprises a receiver that receives an acknowledgement from the remote unit indicating that the configured network slice selection assistance information is updated at the remote unit.

In one embodiment, the transmitter transmits information to a unified data management function indicating that the configured network slice selection assistance information is updated at the remote unit.

In one embodiment, a method comprises: receiving, at a remote unit, a configured network slice selection assistance information for a public land mobile network via an access and mobility management function, wherein the access and mobility management function, a network slice selection function, or a combination thereof determines the configured network slice selection assistance information in response to a trigger from the access and mobility management function.

In certain embodiments, the access and mobility management function determines the configured network slice selection assistance information.

In some embodiments, the access and mobility management function determines the configured network slice selection assistance information in response to not receiving information about network slice selection assistance information in a registration request.

In various embodiments, the access and mobility management function determines the configured network slice selection assistance information in response to determining that the remote unit should be provided the configured network slice selection assistance information.

In one embodiment, the access and mobility management function determines the configured network slice selection assistance information based on an indication from a subscription repository about updated network slice subscription data related to the remote unit.

In certain embodiments, the network slice selection function determines the configured network slice selection assistance information.

In some embodiments, the network slice selection function determines the configured network slice selection assistance information in response to a request from the access and mobility management function not including a requested network slice selection assistance information.

In various embodiments, the method further comprises transmitting an acknowledgement from the remote unit indicating that the configured network slice selection assistance information is updated at the remote unit.

In one embodiment, an apparatus comprises: a receiver that receives a configured network slice selection assistance information for a public land mobile network via an access and mobility management function, wherein the access and mobility management function, a network slice selection function, or a combination thereof determines the configured network slice selection assistance information in response to a trigger from the access and mobility management function.

In certain embodiments, the access and mobility management function determines the configured network slice selection assistance information.

In some embodiments, the access and mobility management function determines the configured network slice selection assistance information in response to not receiving information about network slice selection assistance information in a registration request.

In various embodiments, the access and mobility management function determines the configured network slice selection assistance information in response to determining that the apparatus should be provided the configured network slice selection assistance information.

In one embodiment, the access and mobility management function determines the configured network slice selection assistance information based on an indication from a subscription repository about updated network slice subscription data related to the apparatus.

In certain embodiments, the network slice selection function determines the configured network slice selection assistance information.

In some embodiments, the network slice selection function determines the configured network slice selection assistance information in response to a request from the access and mobility management function not including a requested network slice selection assistance information.

In various embodiments, the apparatus further comprises a transmitter that transmits an acknowledgement indicating that the configured network slice selection assistance information is updated at the apparatus.

In one embodiment, a method comprises: receiving, at a remote unit, first configured network slice selection assistance information for a first public land mobile network; storing, at the remote unit, the first configured network slice selection assistance information for the first public land mobile network; transmitting a first acknowledgment in response to receiving the first configured network slice selection assistance information, wherein the first acknowledgment indicates that the first configured network slice selection assistance information was received; receiving, at the remote unit, second configured network slice selection assistance information for a second public land mobile network; storing, at the remote unit, the second configured network slice selection assistance information for the second public land mobile network; and transmitting a second acknowledgment in response to receiving the second configured network slice selection assistance information, wherein the second acknowledgment indicates that the second configured network slice selection assistance information was received.

In one embodiment, an apparatus comprises: a receiver that receives first configured network slice selection assistance information for a first public land mobile network; a processor that stores the first configured network slice selection assistance information for the first public land mobile network; a transmitter that transmits a first acknowledgment in response to receiving the first configured network slice selection assistance information, wherein the first acknowledgment indicates that the first configured network slice selection assistance information was received, wherein: the receiver receives second configured network slice selection assistance information for a second public land mobile network; the processor stores the second configured network slice selection assistance information for the second public land mobile network; and the transmitter transmits a second acknowledgment in response to receiving the second configured network slice selection assistance information, wherein the second acknowledgment indicates that the second configured network slice selection assistance information was received.

In one embodiment, a method comprises: determining, within a unified data management function, a default network slice selection assistance information for a public land mobile network for a remote unit; and providing the default network slice selection assistance information to the remote unit.

In certain embodiments, the method further comprises receiving an acknowledgment indicating that the remote unit is updated with the default network slice selection assistance information.

In some embodiments, the method further comprises receiving information indicating a subscription change.

In various embodiments, the method further comprises updating the default network slice selection assistance information in response to receiving the information indicating the subscription change.

In one embodiment, the method further comprises providing the updated default network slice selection assistance information to the remote unit.

In certain embodiments, providing the default network slice selection assistance information to the remote unit comprises providing the default network slice selection assistance information to the remote unit via an access and mobility management function.

In some embodiments, the default network slice selection assistance information is included in a non-access stratum signaling message sent from an access and mobility management function.

In various embodiments, in response to providing the default network slice selection assistance information, stored default network slice selection assistance information is updated by the remote unit.

In one embodiment, determining the default network slice selection assistance information for a public land mobile network for the remote unit comprises determining the default network slice selection assistance information for public land mobile networks for which no specific configured network slice selection assistance information has been provided to the remote unit.

In one embodiment, an apparatus comprises: a processor that determines, within a unified data management function, a default network slice selection assistance information for a public land mobile network for a remote unit; and a transmitter that provides the default network slice selection assistance information to the remote unit.

In certain embodiments, the method further comprises a receiver that receives an acknowledgment indicating that the remote unit is updated with the default network slice selection assistance information.

In some embodiments, the apparatus further comprises a receiver that receives information indicating a subscription change.

In various embodiments, the processor updates the default network slice selection assistance information in response to receiving the information indicating the subscription change.

In one embodiment, the transmitter provides the updated default network slice selection assistance information to the remote unit.

In certain embodiments, the transmitter providing the default network slice selection assistance information to the remote unit comprises the transmitter providing the default network slice selection assistance information to the remote unit via an access and mobility management function.

In some embodiments, the default network slice selection assistance information is included in a non-access stratum signaling message sent from an access and mobility management function.

In various embodiments, in response to the transmitter providing the default network slice selection assistance information, stored default network slice selection assistance information is updated by the remote unit.

In one embodiment, the processor determines the default network slice selection assistance information for a public land mobile network for the remote unit by determining the default network slice selection assistance information for public land mobile networks for which no specific configured network slice selection assistance information has been provided to the remote unit.

In one embodiment, a method comprises: receiving, at a remote unit, a default network slice selection assistance information for a public land mobile network, wherein a unified data management function determines the default network slice selection assistance information and provides the default network slice selection assistance information to the remote unit.

In certain embodiments, the method further comprises transmitting an acknowledgment indicating that the remote unit is updated with the default network slice selection assistance information.

In some embodiments, the unified data management function provides the default network slice selection assistance information to the remote unit via an access and mobility management function.

In various embodiments, the default network slice selection assistance information is included in a non-access stratum signaling message sent from an access and mobility management function.

In one embodiment, the method further comprises, in response to receiving the default network slice selection assistance information, updating stored default network slice selection assistance information of the remote unit.

In certain embodiments, the unified data management function determines the default network slice selection assistance information by determining the default network slice selection assistance information for public land mobile networks for which no specific configured network slice selection assistance information has been provided to the remote unit.

In one embodiment, an apparatus comprises: a receiver that receives a default network slice selection assistance information for a public land mobile network, wherein a unified data management function determines the default network slice selection assistance information and provides the default network slice selection assistance information to the apparatus.

In certain embodiments, the apparatus further comprises a transmitter that transmits an acknowledgment indicating that the apparatus is updated with the default network slice selection assistance information.

In some embodiments, the unified data management function provides the default network slice selection assistance information to the apparatus via an access and mobility management function.

In various embodiments, the default network slice selection assistance information is included in a non-access stratum signaling message sent from an access and mobility management function.

In one embodiment, the apparatus further comprises a processor that, in response to the receiver receiving the default network slice selection assistance information, updates stored default network slice selection assistance information of the apparatus.

In certain embodiments, the unified data management function determines the default network slice selection assistance information by determining the default network slice selection assistance information for public land mobile networks for which no specific configured network slice selection assistance information has been provided to the apparatus.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An access and mobility management function (AMF), the AMF comprising:
   at least one memory; and
   at least one processor coupled with the at least one memory and configured to cause the AMF to:
      determine a configured network slice selection assistance information (NSSAI) for a public land mobile network (PLMN) associated with a user equipment (UE) and allowed NSSAI applicable for a registration area of the UE;
      receive an indication, from a unified data management function (UDM), of a change to one or more subscribed single NSSAI; and
      provide, to the UE, the configured NSSAI and the allowed NSSAI based at least in part on the received indication of the change to the one or more subscribed single NSSAI.

2. The AMF of claim 1, wherein the at least one processor is configured to cause the AMF to:
   receive, from a network slice selection function (NSSF), the configured NSSAI.

3. The AMF of claim 1, wherein the at least one processor is configured to cause the AMF to:
   determine the configured NSSAI for the PLMN based at least in part on no reception of a requested NSSAI.

4. The AMF of claim 1, wherein the at least one processor is configured to cause the AMF to:
   determine the configured NSSAI for the PLMN based at least in part on a requested NSSAI being invalid for the PLMN.

5. The AMF of claim 1, wherein the at least one processor is configured to cause the AMF to:
   provide, to the UE, the configured NSSAI based at least in part on a change to one or more subscribed single NSSAI.

6. The AMF of claim 1, wherein the at least one processor is configured to cause the AMF to:
   receive an acknowledgment from the UE in response to the provided configured NSSAI.

7. The AMF of claim 1, wherein the at least one processor is configured to cause the AMF to:
   transmit, to the UDM, an indication of successful provisioning of the configured NSSAI.

8. The AMF of claim 1, wherein the PLMN comprises a serving PLMN.

9. A method performed by an access and mobility management function (AMF), the method comprising:
   determining a configured network slice selection assistance information (NSSAI) for a public land mobile network (PLMN) associated with a user equipment (UE) and allowed NSSAI applicable for a registration area of the UE;
   receiving an indication, from a unified data management function (UDM), of a change to one or more subscribed single NSSAI; and
   providing, to the UE, the configured NSSAI and the allowed NSSAI based at least in part on the received indication of the change to the one or more subscribed single NSSAI.

10. The method of claim 9, further comprising:
   receiving, from a network slice selection function (NSSF), the configured NSSAI.

11. The method of claim 9, further comprising:
determining the configured NSSAI for the PLMN based at least in part on no reception of a requested NSSAI.

12. The method of claim 9, further comprising:
determining the configured NSSAI for the PLMN based at least in part on a requested NSSAI being invalid for the PLMN.

13. The method of claim 9, further comprising:
providing, to the UE, the configured NSSAI based at least in part on a change to one or more subscribed single NSSAI.

* * * * *